(12) United States Patent
Hempleman et al.

(10) Patent No.: US 8,126,923 B1
(45) Date of Patent: Feb. 28, 2012

(54) LIST BUILDING SYSTEM

(75) Inventors: James D. Hempleman, Chicago, IL (US); Sandra M. Hempleman, Chicago, IL (US); Neil A. Schneider, Lake Zurich, IL (US)

(73) Assignee: Premier International Associates, LLC, Chicago, IL (US)

( * ) Notice: Subject to any disclaimer, the term of this patent is extended or adjusted under 35 U.S.C. 154(b) by 1406 days.

(21) Appl. No.: 11/678,414

(22) Filed: Feb. 23, 2007

Related U.S. Application Data

(60) Division of application No. 10/841,374, filed on May 7, 2004, now abandoned, which is a continuation of application No. 09/770,882, filed on Jan. 26, 2001, now Pat. No. 6,763,345, which is a continuation of application No. 08/859,995, filed on May 21, 1997, now Pat. No. 6,243,725.

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 3,291,919 A | 12/1966 | Robitaille |
| 3,990,710 A | 11/1976 | Hughes |
| 4,186,725 A | 2/1980 | Schwartz |
| 4,472,747 A | 9/1984 | Schwartz |
| 4,528,643 A | 7/1985 | Freeny, Jr. |
| 4,559,570 A | 12/1985 | Schwartz |
| 4,636,876 A | 1/1987 | Schwartz |
| 4,647,989 A | 3/1987 | Geddes |
| 4,675,755 A | 6/1987 | Baumeister et al. |
| 4,682,248 A | 7/1987 | Schwartz |
| 4,703,465 A | 10/1987 | Parker |
| 4,725,977 A | 2/1988 | Izumi et al. |
| 4,744,281 A | 5/1988 | Isozaki |
| 4,755,889 A | 7/1988 | Schwartz |
| 4,766,581 A | 8/1988 | Korn et al. |
| 4,779,252 A | 10/1988 | Custers et al. |
| 5,046,004 A | 9/1991 | Tsumura et al. |
| 5,113,383 A | 5/1992 | Amemiya et al. |
| 5,132,992 A | 7/1992 | Yurt et al. |
| 5,157,643 A | 10/1992 | Suzuki |
| 5,168,481 A | 12/1992 | Culbertson et al. |
| 5,173,888 A | 12/1992 | An |

(Continued)

OTHER PUBLICATIONS

Liquid Audio Liquid Player Five the CD Quality Music Player for the Internet; Four (4) pages; Copyright 1999 Liquid Audio Inc.

(Continued)

*Primary Examiner* — Isaac M Woo
(74) *Attorney, Agent, or Firm* — Eugene M. Cummings, P.C.

(57) ABSTRACT

A system implementable using a programmable processor includes a plurality of pre-stored commands for building an inventory of audio, musical, works or audio/visual works, such as music videos. A plurality of works can be collected together in a list for purposes of establishing a play or a presentation sequence. The list can be visually displayed and edited. A plurality of lists can be stored for subsequent retrieval. A selected list can be retrieved and executed. Upon execution, the works of the list are presented sequentially either audibly or visually. The works can be read locally from a source, such as a CD, or can be obtained, via wireless transmission, from a remote inventory. If desired, establishment of a predetermined credit can be a pre-condition to being able to add items to the list for presentation.

3 Claims, 32 Drawing Sheets

U.S. PATENT DOCUMENTS

| | | | |
|---|---|---|---|
| 5,173,900 | A | 12/1992 | Miller et al. |
| 5,181,107 | A | 1/1993 | Rhoades |
| 5,191,573 | A | 3/1993 | Hair |
| 5,197,047 | A | 3/1993 | Witheridge et al. |
| 5,262,940 | A | 11/1993 | Sussman |
| 5,288,982 | A | 2/1994 | Hosoya |
| 5,317,732 | A | 5/1994 | Gerlach et al. |
| 5,331,614 | A | 7/1994 | Ogawa et al. |
| 5,341,350 | A | 8/1994 | Frank et al. |
| 5,355,302 | A | 10/1994 | Martin et al. |
| 5,418,713 | A | 5/1995 | Allen |
| 5,428,732 | A | 6/1995 | Hancock et al. |
| 5,475,835 | A | 12/1995 | Hickey |
| 5,481,509 | A | 1/1996 | Knowles |
| 5,515,347 | A | 5/1996 | Mulder et al. |
| 5,541,638 | A | 7/1996 | Story |
| 5,550,575 | A | 8/1996 | West et al. |
| 5,557,541 | A | 9/1996 | Schulhof et al. |
| 5,561,604 | A | 10/1996 | Buckley et al. |
| 5,566,353 | A | 10/1996 | Cho et al. |
| 5,583,922 | A | 12/1996 | Davis et al. |
| 5,586,235 | A | 12/1996 | Kauffman |
| 5,594,601 | A | 1/1997 | Mimick et al. |
| 5,616,876 | A * | 4/1997 | Cluts ............................ 84/609 |
| 5,629,867 | A | 5/1997 | Goldman |
| 5,633,839 | A | 5/1997 | Alexander et al. |
| 5,633,842 | A | 5/1997 | Nishida et al. |
| 5,654,944 | A | 8/1997 | Lee et al. |
| 5,668,788 | A | 9/1997 | Allison |
| 5,670,730 | A | 9/1997 | Grewe et al. |
| 5,675,734 | A | 10/1997 | Hair |
| 5,683,253 | A | 11/1997 | Park et al. |
| 5,689,481 | A | 11/1997 | Tamura et al. |
| 5,691,964 | A | 11/1997 | Niederlein et al. |
| 5,691,972 | A | 11/1997 | Tsuga et al. |
| 5,726,909 | A | 3/1998 | Krikorian |
| 5,726,956 | A | 3/1998 | Kanno |
| 5,732,067 | A | 3/1998 | Aotake |
| 5,734,823 | A | 3/1998 | Saigh et al. |
| 5,740,134 | A | 4/1998 | Peterson |
| 5,751,672 | A | 5/1998 | Yankowski |
| 5,754,521 | A | 5/1998 | Yokota |
| 5,793,980 | A | 8/1998 | Glaser et al. |
| 5,794,249 | A | 8/1998 | Orsolini et al. |
| 5,798,921 | A | 8/1998 | Johnson et al. |
| 5,801,694 | A | 9/1998 | Gershen |
| 5,809,246 | A | 9/1998 | Goldman |
| 5,819,160 | A | 10/1998 | Foladare et al. |
| 5,822,284 | A | 10/1998 | Nishizawa |
| 5,860,068 | A | 1/1999 | Cook |
| 5,864,868 | A | 1/1999 | Contois |
| 5,867,457 | A | 2/1999 | Parvulescu et al. |
| 5,875,110 | A | 2/1999 | Jacobs |
| 5,892,915 | A | 4/1999 | Duso et al. |
| 5,903,892 | A | 5/1999 | Hoffert et al. |
| 5,914,941 | A | 6/1999 | Janky |
| 5,918,213 | A | 6/1999 | Bernard et al. |
| 5,918,223 | A | 6/1999 | Blum et al. |
| 5,918,303 | A | 6/1999 | Yamaura et al. |
| 5,926,624 | A | 7/1999 | Katz et al. |
| 5,949,411 | A | 9/1999 | Doerr et al. |
| 5,956,716 | A | 9/1999 | Kenner et al. |
| 5,963,957 | A | 10/1999 | Hoffberg |
| 5,969,283 | A | 10/1999 | Looney et al. |
| 5,974,503 | A | 10/1999 | Venkatesh et al. |
| 5,983,069 | A | 11/1999 | Cho et al. |
| 5,986,979 | A | 11/1999 | Bickford et al. |
| 6,011,760 | A | 1/2000 | Fleming, III |
| 6,011,761 | A | 1/2000 | Inoue |
| 6,047,292 | A | 4/2000 | Kelly et al. |
| 6,055,566 | A | 4/2000 | Kikinis |
| 6,058,428 | A | 5/2000 | Wang et al. |
| 6,062,868 | A | 5/2000 | Toriumi |
| 6,065,042 | A | 5/2000 | Reimer et al. |
| 6,067,279 | A | 5/2000 | Fleming, III |
| 6,118,450 | A | 9/2000 | Proehl et al. |
| 6,128,255 | A | 10/2000 | Yankowski |
| 6,437,229 | B1 | 8/2002 | Nobumoto |
| 6,446,080 | B1 | 9/2002 | Van Ryzin et al. |
| 6,587,403 | B1 | 7/2003 | Keller et al. |
| 7,143,102 | B2 | 11/2006 | Fiennes et al. |
| 2002/0010788 | A1 | 1/2002 | Nathan et al. |
| 2002/0016968 | A1 | 2/2002 | Nathan et al. |
| 2003/0014333 | A1 | 1/2003 | Brown |
| 2003/0065639 | A1 | 4/2003 | Fiennes et al. |
| 2004/0078761 | A1 | 4/2004 | Ohanian |

OTHER PUBLICATIONS

Rocky Mountain News, Denver, Colorado; "Company Sees Future in Digital Recorders" Jul. 22, 1984; One (1) Page.
Rolling Stones; "Americans have bee taking them out for a Spin for more than a Century"; One (1) page.
CompuSonics Digital Audio Telecommunications System; Copyright 1985 CompuSonics Corp.; One (1) page.
Industriell Datateknik Aug. 1984; "Stereobandspelare Med Flexskiva"; One (1) page.
AES 76th Convention, NYC; Specifications and Implementation of a Computer Audio Console for Digital Mixing and Recording; by David M. Schwartz; Dated Jun. 20, 1984; Two (2) pages.
AES 76th Convention, NYC; Strategies for the Representation and Data Reduction of Digital Music Signals; by John P. Stautner; Dated Jun. 20, 1984; Two (2) pages.
AES 76th Convention, NYC; A High Speed Telecommunications Interface for Digital Audio Transmission and Reception; Hyun Heinz Sohn; Dated Jun. 20, 1984; Two (2) pages.
Architecture of a Real Time Digital Filterbank Processor for Tempered, Auditory, and Critical-Band Analysis/Synthesis; by Gary W. Schwede, Ph.D.; One (1) page.
Brochure for CompuSonics Video; DVR-1 Digital Video Recorder; One (1) page.
Photocopy of CompuSonics DSP-100; One (1) page.
Photocopy of a CompuSonics video demo disk; Copyright CompuSonics Video, 1986; One (1) page.
Photocopies of the DSP-1000 Digital Disk Recorder/Player at the AES show in Chicago Summer of 1985; One (1) page.
A photo of the the first CompuSonics professional all digital computer audio recording system; Handwritten date 1984; One (1) page.
A photo taken of a billboard bearing an advertisement; One (1) page.
Consumer Electronics June of 84 vol. No. 12; Watch out digital discs: Here comes floppy audio; One (1) page.
Audio Times Summer CES Preview vol. 26 No. 5; "Digital Recording System Uses Floppy Discs"; May 1984; Two (2) pages.
Article handwritten date of Apr. 20, 1984 from a Louisville, KY newspaper; "New Technology Challenges the Compact Disc"; One (1) page.
Digital Audio and Compact Disc Review; dated Sep. 1985; Two (2) pages.
Stereo Review vol. 59 Dated Dec. 1984; "New Hi-Fi Horizons"; by David Ranada; Six (6) pages.
Pro Sound News, New York, NY; Dated Jun. 1984; "CompuSonics Bows Totally Digital"; One (1) page.
IntoWorld—The Newsweekly for Microcomputer Users; vol. 6, Issue 23; Dated May 11, 1984; "From the Desk" One (1) page.
"CompuSonics Wants to Create a Missing Link"; by John Schneidswind; Three (3) pages.
Fax Memo to Michael Kapp, President of Warner Bros. Special Products from David Schwartz, Chairman of CompuSonics; Dated Apr. 26, 1990; Regarding CSX Pay Per Listen System; One (1) page.
Pay Per Listen Cable Audio System; Copyright 1990 CompuSonics Corp.; Notes to Viewgraph presentation; One (1) page.
Pay Per Listen Cable Audio System; Copyright 1990 CompuSonics Corp.; System Payback Analysis; One (1) page.
Pay Per Listen Cable Audio System; Copyright 1990 CompuSonics Corp.; Objective; Seven (7) pages.
CompuSonics—Executive Summary of a Proposed Video Floppy Disk Company; Created before Jul. 30, 1985; Three (3) pages.
Article about CompuSonics' DSP 1000; One (1) page (best available copy).
Google search for CompuSonics; Dated Apr. 1, 2004; Two (2) pages.
CompuSonics Application Notes for DSP 1000 Digital Audio Disk Recorder; Copyright 1986 CompuSonics Corp.; Two (2) pages.

CompuSonics 1998 Product Line; Four (4) pages.
A postcard mailed in Sep. 1986 (handwritten) of CompuSonics DSP 1000; Two (2) pages.
CompuSonics Video Application Notes; Copyright 1986; Four (4) pages.
CompuSonics DSP 1000 Audio Computer brochure; Copyright 1987 CompuSonics Corp.; One (1) page.
CompuSonics DSP 1500 Digital Audio Cart Recorder brochure; One (1) page.
CompuSonics PC/Sonics Remote Control and Relational Database Software brochure; Copyright 1987; One (1) page.
CompuSonics DSP-1000 Digital Disk Recorder/Player; Copyright 1984; One (1) page.
Business article regarding CompuSonics Corporation; Four (4) pages.
Business article regarding CompuSonics Corporation; Six (6) pages.
Google search results for CompuSonics; Dated Apr. 1, 2004; Two (2) pages.
Article entitled "The Audio Computer and its Applications" by David Schwartz and John Stautner; CompuSonics Corporation; Ten (10) pages.
Prototype of User Documentation for DSP Library; CompuSonics Corp.; Dated Jun. 21, 1985; Four (4) pages.
Sightsound vs. N2K; David M Schwarts; Dated Feb. 1, 2001; Seventy-Nine (79) pages.
The Digital Recording Report; Dated Apr. 1986; vol. 3, No. 4; Eight (8) pages.
Computer program dated Jun. 21, 1985; One (1) page.
Computer program dated Jun. 21, 1985; Two (2) pages.
Liquid Audio White Paper: Buying Music Over the Internet; by: Ruth Colombo; Copyright 1997 by Liquid Audio, Inc.; Dated Aug. 8, 1997; Seven (7) pages.
Liquid Audio—Liquid Audio debuts premier music on demand solution for the Internet; M2 Presswire; Copyright 1996 M2 Communications Ltd.; Dated Nov. 4, 1996; Two (2) pages.
Digital Commerce—New ways of sending radio over the Net promise mor sound and less static; by: John Markoff; Copyright 1996 The New York Times Company; The New York Times; Dated Aug. 12, 1996- Late Edition; Two (2) pages.
Heard on the beat; Sound of CD-quality music flowing on web; by Karen Kaplan; Copy right 1996 The Times Mirror Company; Los Angeles Times; Dated Nov. 25, 1996—Home Edition; Two (2) pages.
Enteractive Briefs: Near-Cd-Quailty music flowing from internet; Copyright 1996 Billboard Publications, Inc.; Billboard; Dated Nov. 16, 1996; Two (2) pages.
Cyberscene; Copyright 1997 Sentinel Communications Co., Orlando Sentinel (Florida); Dated Mar. 1, 1997—Metro; Two (2) pages.
Liquid Audio Brings Dolby Digital Internet Audio to Macintosh Computers; Copyright 1997 Business Wire, Inc., Business Wire; Dated Apr. 7, 1997; Two (2) pages.
Liquid Audio Delivers Dolby Digital Music via Web; by Jeremy Carl; Copyright 1997 Mecklermedia Corporation, Internet World; Dated Mar. 24, 1997; Two (2) pages.
Liquid Audio Sales brochure by Liquid Audio; Copyright 1998 Liquid Audio, Inc.; Eight (8) pages.
McNab, "Towards the Digital Music Library: Tune Retrieval from Acoustic Input," pp. 11-96, Association of Computing Machinery, 1996.
Wold, "Content-Based Classification, Search, and Retrieval of Audio," pp. 27-36, Institute of Electrical and Electronics Engineers, 1996.
Pfeiffer, "Automatic Audio Content Analysis," pp. 21-30, Association of Computing Machinery, 1996.
Woo, Office Action Mailed Jun. 6, 2007 in U.S. Appl. No. 10/841,374, United States Patent & Trademark Office.
Ferris III, Office Action Mailed Oct. 3, 2007 in Reexamination No. 95/000,201, United States Patent & Trademark Office.
Ferris III, Office Action Mailed Oct. 3, 2007 in Reexamination No. 90/008,361, United States Patent & Trademark Office.
"Wegener Announces MPEG-Based System for Broadcasters Using Micropolis Video Servers," Mar. 27, 1995.
Ace, "Joystick Operation", Nov. 1985. Ampex Corporation, Ampex Training Department. (4 pages).

Aotaki, Keith. "Field Report: Louth Automation ADC-100", Broadcast Engineering, Apr. 1994. Intertec Publishing Corp, Overland Park, KS. (2 pages).
"CartWorks Version 5.xx: System Installation Guide", dbm Systems, Inc., Ridgeland, MS. (21 pages).
"CartWorks: File Utilities, User's Manual", dbm Systems, Inc., Ridgeland, MS. Amended Jul. 18, 1998. (8 pages).
"CartWorks: MHD 'Music-on-Hard-Drive' User's Manual (V6.8)", dbm Systems, Inc., Ridgeland MS. (11 pages).
"CartWorks: MHD 'Music-on-Hard-Drive' QuickSchedule User's Manual", Revised on Feb. 28, 1998. dbm Systems, Inc., Ridgeland, MS. (8 pages).
"CartWorks: On-Demand Editor User's Manual", dbm Systems, Inc., Ridgeland, MS. (7 pages).
"CartWorks: Script Editor User's Manual (v3.12)", dbm Systems, Inc., Ridgeland, MS. (26 pages).
"CartWorks: Spot Set Editor User's Manual", dmb Systems, Inc., Ridgeland, MS. (11 pages).
"CMX 3400: Operations Manual", Aug., 1984 (Revision A: Jan. 2, 1985). CMX Corporation, Santa Clara, CA. p. 3-2. (3 pages).
Brooks Harris. "Off-line/On-line Video Editing: Considerations of Cost Effective Video Post Production". Nov., 1983. (9 pages).
Huber, David Miles. "Audio Production Techniques for Video". 1987. pp. 286-293. (5 pages).
"Grass Valley Group Integrated Production System: IPS 100 Operator's Guide". 1988. Grass Valley Group, Inc. p. 7-1. (3 pages).
"Lake: Making Waves" promotional materials. Lake Systems Corporation, Newton, MA. (10 pages).
"On Air", Louth Automation promotional materials. 1997. Louth Automation. (10 pages).
Mahon, Chandos, "N1 Finds a Match with Louth", TV Technology. Dec. 1994. (1 page).
Cassanmagnago, Mauro. "Louth Brings PC Control to Telepiu", TV Technology. Jan., 1994. (2 pages).
"Profile Professional Disk Recorder PDR 100". Tektronix Profile Professional Disk Recorder PDR 100 promotional materials. 1996. Tektronix, Inc. (4 pages).
"User Manual: Tektronix Profile Family". Apr., 1997. Tektronix, Inc., Wilsonville, OR. (158 pages).
"Master System" promotional material for Sadie Digital Editing. (2 pages).
"BVE-2000 System Information Manual". Sony Corp. Japan. p. 54 (3 pages).
"BVE-9001/02 Operating Program". Sony Corp. pp. 1-1 and 5-16. (2 pages).
"1-inch Delta Time Recorder, SMPTE/EBU Type-C Format: BVH-2500/2500P" promotional material. Sony Corp. (11 pages).
"Studio Recorders and Players: BVW-75". Sony Corp. (1 page).
"Virtual Recorder Manual". Revised Sep. 9, 1996 and Oct. 20, 1996. ASC Audio Video Corp. (94 pages).
"Broadcast Tools: SpotBase, PlayList & TapeBase" promotional materials. ASC Audio Video Corporation, Burbank, CA. (1 page).
"VR300 MPEG-2 Video Server: Product Preview" promotional materials. ASC Audio Video Corporation, Burbank, CA. (1 page).
"VR300 Broadcast Video Server" promotional materials. 1997. ASC Audio Video Corporation, Burbank, CA. (9 pages).
"VR300 Video Server User Manual, Version 1.0". Mar. 20, 1998. ASC Audio Video Corporation. pp. I-V; 3-1 to 4-19; 4-29 to 5-5. (40 pages).
Byrne, Richard and Murphy, Karen. "RCS Works Cart Wall: User's Guide and Reference Manual". Feb. 1994. RCS, Scarsdale, NY. pp. i to 79; M-5. (83 pages).
"CartWorks: Digital Audio Just Got Easier!" promotional materials, CartWorks dbm Systems, Inc., Ridgeland, MS. (4 pages).
CartWorks V10, promotional materials. CartWorks dbm Systems, Inc., Ridgeland, MS. (1 page).
Bailey, Chris. "CartWorks Eases Labor Pains", Radio World Buyer's Guide User Report. Jun. 26, 1996. (1 page).
"LaKart-200 Multi-Channel Automation System" promotional materials. 1991. BASYS Automation Systems, Inc. (9 pages).
Byrne, Richard and Murphy, Karen. "RCS Works: The Log Editor, User's Guide and Reference Manual". May 6, 1994. RCS, Scarsdale, NY. (43 pages).

"PBS Local Insertion Server: Instruction Manual". Jun. 19, 1996. Microvision, Inc., Budd Lake, NJ. (71 pages).

"NewStar News Automation and Editing Systems" promotional materials. Dec. 1996. Tektronix, Inc., USA. (6 pages).

"Portable MiniDisc Recorder MZ-1: Operating Instructions". Sony Corporation. (45 pages).

WaveStation Digital Audio Automation System: Instruction & Operations Manual. 1997. BSI Broadcast Software International, Gendale, AZ. (113 pages).

"Windows '95 CD player" manual (14 pages).

"Wegener to Market Digital MPEG-2 Based Video File Server", MultiMedia World Daily News, NAB Broadcasters. Apr. 11-12, 1995. (8 pages).

"The DAD486X Digital Audio Delivery System Operation Manual, Version 6.0A'". 1990-1995. Revised Jun. 30, 1995. ENCO Systems, Inc., Farmington Hills, MI, (348 pages).

"The DADPro Digital Audio Delivery System Operation Manual: Version 1.0". 1996. Revised Aug. 20, 1996. ENCO Systems, Inc., Farmington Hills, MI. (424 pages).

"Master Control Manual: The Paperless and Cartless Studio System. Version 3.03". 1990-1994, Radio Computing Services, Inc. (216 pages).

"Master Control: System Training Outline". 1995-1996. Radio Computing Services, Inc., Scarsdale, NY. (205 pages).

Murphy, Karen, et al. "RCS Works. OG2: The On-Air Workstation, User's Guide and Reference Manual". Nov. 15, 1994, RCS, Scarsdale, NY. (45 pages).

"Selector: The Music Scheduling System, Manual". 1979-1991. RCS Radio Computing Services, Inc., Scarsdale, NY. (882 pages).

Farber, David. "PN's Announcement of RealAudio (Nice New Product I had betaed)". Apr. 10, 1995. www.interesting-people.org (3 pages).

Zuckerman, Laurence. "Internet Audio Minus the Delays Is Set to Start on the Web Today". New York Times, Apr. 10, 1995, New York Times Company (2 pages).

"RealAudio Server Administrator's Guide: Release 2.0". 1995, 1996. Progressive Netorks, Inc., USA. (106 pages).

"RealAudio Content Creation Guide: RealAudio Encoder Release 2.0", 1995, 1996. Progressive Networks, Inc., USA. (49 pages).

"RealAudio Player Plus". 1996. Progressive Networks, Inc., Seattle, WA. (42 pages).

"Defendant Apple Computer, Inc.'s Preliminary Invalidity Contentions" Civil Action No. 05-CV-506 *Premier International Associates, L.L.C.* v. *Apple Computer Co*. Aug. 21, 2006.

Microsoft's "The Complete Idiot's Guide to Windows 95" by Paul McFedries with Faithe Wempen, 412 pages; 1995 Que Corporation.

Alpha Books' "The Complete Idiot's Guide to Windows 95"; Second Edition by Paul McFedries; 1997 Que Corporation; 404 pages.

"Plaintiff Premier International's Opening Brief Regarding Claim Construction"; Civil Action No. 2-05CV-506; *Premier International Associates, LLC* v. *Apple Computer, Inc*.; Filed Apr. 16, 2007; 285 pages.

List bearing the date Jan. 24, 1996 describing A Real 32 BIT Windows 95 CD Player.

DADPro Digital Audio Delivery System Brochure, Enco America, Farmington Hills, MI, 1995.

"Parties Compliance With Patent Rule 4-3" Civil Action No. 2-05-Cv-506 TJW, *Premier International Associates, L.L. C.* v. *Apple Computer, Inc*. Mar. 9, 2007.

Apple Computer, Amended Answer in Civil Action No. 2-05CV-506.

Premier International, Answer to Counterclaims in Civil Action No. 2-05CV-506.

Premier International, Motion to Strike in Civil Action No. 2-05CV-506.

Apple Computer, Opposition to Motion to Strike in Civil Action No. 2-05CV-506.

Premier International, Reply to Opposition to Motion to Strike in Civil Action No. 2-05CV-506.

Premier International, Opening Claim Construction Brief in Civil Action No. 2-05CV-506.

Apple Computer, Claim Construction Brief in Civil Action No. 2-05CV-506.

Premier International, Reply to Claim Construction Brief in Civil Action No. 2-05CV-506.

Judge Everinghman, Markman Order in Civil Action No. 2-05CV-506.

Court Transcript, Markman Hearing Minutes in Civil Action No. 2-05CV-506.

N/A, Docket Report for Civil Action No. 2-05CV-506.

Schneider, Deposition of Neil Schneider Transcript—Part 1, Jul. 11, 2007.

Schneider, Deposition of Neil Schneider Transcript—Part 2, Jul. 11, 2007.

Novacek, Deposition of Eugene Novacek Transcript, May 30, 2007.

Hempleman, Deposition of James Hempleman Transcript, Part 1, Jan. 25, 2007.

Hempleman, Deposition of James Hempleman Transcript, Index, Jan. 25, 2007.

Hempleman, Deposition of James Hempleman Transcript, Part 2, Jan. 26, 2007.

Hempleman, Deposition of Sandra Hempleman Transcript—Part 1, May 23, 2007.

Hempleman, Deposition of Sandra Hempleman Transcript—Part 2, May 23, 2007.

Hempleman, Deposition of Sandra Hempleman Transcript—Part 3, May 23, 2007.

Hempleman, Deposition of Sandra Hempleman, Index, May 23, 2007.

Unknown, Music Databases, Unknown publication date, MP3 Developments.

Author Unknown, "Video-on-Demand" (1995) published by Tampere University of Technology, Finland, available online at: http://www.cs.tut.fi/tlt/stuff/vod/VoDOverview/vod.html.

Listing bearing the date of Jul. 29, 1996 describing "CDRunner", a CD-related program.

Listing bearing the date Feb. 12, 1996 describing "Music CD", a Windows CD player.

Listing bearing the date Feb. 22, 1996, two pages, describing "Super CD", a Windows CD Driver.

Listing bearing the date Jul. 23, 1995 describing a CD ROM player for use on a PC.

Listing bearing the date Jul. 20, 1995 describing a CD Assistant V 1.0 for Windows.

Listing bearing the date Feb. 1, 1994 describing CDMASTER version 1.2 CD player.

Listing bearing the date Oct. 13, 1996 describing "EagCD", a program for playing CDs.

Listing bearing the date Feb. 5, 1996 describing "CD Satellite 3", a music playing program.

Listing bearing the date Feb. 1, 1994 describing "CDAUDIO V1.27U", a CD audio player.

Listing bearing the date Feb. 1, 1994 describing an Audio Compact disc Player for Windows.

Listing bearing the date Feb. 1, 1994 describing a CD player for Windows.

Listing bearing the date Jun. 23, 1994 describing "Mega CD V1.1 Audio Honker for Windows", a CD audio player.

Listing bearing the date Dec. 20, 1994 describing "WinDisc", a CD audio player.

Listing bearing the date Jan. 24, 1996 describing "A Real 32 BIT" CD player for Windows 95.

Listing dated Feb. 1, 1994 describing a package called "CD Player 2.0 for Windows".

Listing dated May 25, 1995 describing "CD Wizzard", a CD audio player.

Listing dated Sep. 14, 1995 describing CD Tray, Version 3.03, a data base system for CDs.

Listing dated Aug. 13, 1995 describing "Optical Jammer 4.0", A CD audio player.

Listing dated Oct. 13, 1996 describing EagCD, an audio CD playing utility.

Listing dated Feb. 1, 1994 describing "CDMASTER", A CD audio player.

Listing dated Oct. 3, 1993 describing "Audio Pro", a CD audio player.

Listing dated Nov. 5, 1995 describing "the Pause Provider", for editing a player list.
Listing dated Apr. 16, 1995 describing Version 4.00 of DMP a module player for MS-DOS machines.
Listing dated Dec. 20, 1994 describing "WINDISC", an audio CD player.
Listing dated Feb. 5, 1996 describing "CD Satellite 3", an audio CD player and playlist builder.
Listing dated Nov. 14, 1995 describing "RibbonCD V1.0", a CD player for Windows.
Listing dated Oct. 17, 1994 describing "CDBar", an audio CD player for Windows.
Listing dated Jul. 30, 1995 describing "HomeWorks" and "Personal Possessions" programs for organizing personal property such as records, tapes and CDs.
Listing dated Dec. 17, 1995 describing "CD Assistant", a music collection organizer.
Printout dated Dec. 31, 1996 which describes "CD-REC" for recording off of an audio-CD.
Listing dated Sep. 14, 1994 which describes "CD Audio Recorder", for recording off of audio CD.
Listing dated Dec. 17, 1995 describing "CD Assistant" for organizing a music collection.
Listing dated Dec. 31, 1996 which describes "CD-REC" for recording an audio-CD.
Listing dated Feb. 20, 1994 describing "CDGP" for digital recording of an audio-CD.
Listing dated Jul. 11, 1994 which describes "MODAC", a recorder and a player of WAV files.
Listing dated Sep. 14, 1994 which describes "CD Audio Recorder" for recording WAV files off of an audio CD.
Listing dated Oct. 17, 1993 which describes "Wave After Wave", a CD Audio player for Windows 3.1.
Listing dated Apr. 30, 1996 which describes a jukebox playing module usable with Windows 95.
Listing dated Jun. 8, 1993 which describes "Multimedia Changer V1.0" for playing WAV files.
Listing dated Jan. 15, 1995 which describes "WaveMaster", a program for playing WAV files.
Listing dated Feb. 1, 1994 which describes CDAUDIO player for Windows.
Listing dated Apr. 16, 1997 which describes "CDMASTER", a CD player module.
Listing dated May 18, 1996 which describes "TapeMaker", a system for organizing a music collection.
Article dated Dec. 1, 1997 entitled "Download favorite music from Web into computer".
An article believed to have been published Aug. 3, 1997 entitled "World Wide Wurlitzer".
Listing of CD/Spectrum Pro 3.2 Home Page, 2 sheets, a CD audio player, with a last update of Jun. 19, 1997 and two sheets associated therewith defining CDDB Database Connectivity.
Screen shot illustrating aspects of a CD player provided by the Windows 95 Operating System.
Listing bearing the date Jan. 28, 1994 describing two interactive CD related programs, CDBase and CDBase Player.
Nielsen, Jakob et al. "Comparative Design Review: An Exercise in Parallel Design". Apr. 24-29, 1993. Interchi '93.
Lowery, Daryl. "Random-Access Digital Audio-Recording Systems". Jun. 1992.
Order of Dismissal, *Premier International Associates, LLC* v. *Apple Computer, Inc.*, Sep. 18, 2007, Civil Action No. 2:05-CV-506(TJW), US District Court for the Eastern District of Texas, Marshall Division.
Complaint for Patent Infringement, *Premier International Associated, LLC* v. *Microsoft Corp.* et al. Sep. 11, 2007, Civil Action No. 2:07-CV-396, US District Court for the Eastern District of Texas, Marshall Division.
Complaint for Patent Infringement, *Premier International Associated, LLC* v. *Hewlett-Packard Co.* et al., Sep. 11, 2007, Civil Action No. 2:07-CV-395, US District Court for the Eastern District of Texas, Marshall Division.

* cited by examiner

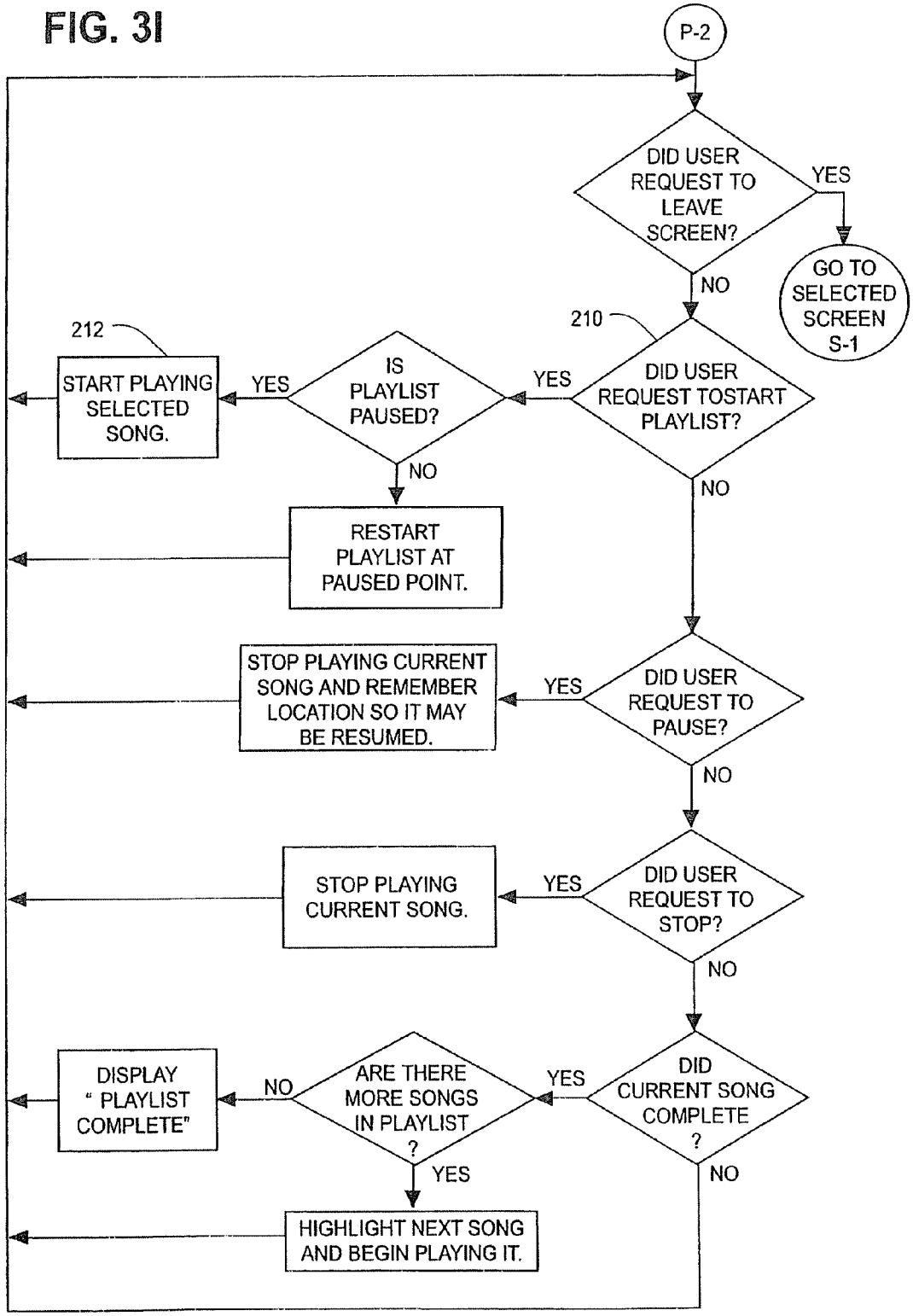

FIG. 4G

PlayList Editor

File  Options  Tables  Help

Recorder | PlayList Editor | PlayList Player | Reports

Media inventory  [Change Selection]

| Title | Artist | Type | Comments | Date Recorded | Time | In List |
|---|---|---|---|---|---|---|
| Beach baby | Regents | Rock N Roll | | 4/21/97 | 4:22 | yes |
| Count on me | Houston, Whitney | Pop | Audio only | 4/18/97 | 4:27 | yes |
| Da Doo Ron Ron | Crystals | Rock N Roll | | 4/9/97 | 2:23 | yes |
| Do you wanna dance | Freeman, Bobby | Rock N Roll | | 4/21/97 | 2:37 | yes |
| Exhale | Houston, Whitney | Pop | Audio and video | 4/9/97 | 3:25 | yes |
| Fun, fun, fun | Jan & Dean | Rock N Roll | | 4/21/97 | 2:12 | yes |
| Help me Rhonda | Jan & Dean | Rock N Roll | | 4/29/97 | 2:56 | yes |
| I believe in you and me | Houston, Whitney | Pop | | 4/29/97 | 4:02 | yes |
| Let it flow | Braxton, Toni | Bluegrass | Audio only | 4/18/97 | 4:27 | yes |
| Little Honda | Hondells | Rock N Roll | | 4/21/97 | 2:02 | yes |
| My heart is calling | Houston, Whitney | Pop | | 4/29/97 | 4:15 | yes |

Destination PlayList  [Change PlayList]  [Save PlayList]  Title: Dinner music 1    Total Play: 1:38:45

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Rock N Roll | | 4/9/97 | 4:26 |
| Surfer Girl | Beach Boys | Rock N Roll | | 4/9/97 | 6:42 |
| My heart is calling | Houston, Whitney | Pop | | 4/29/97 | 10:57 |
| Papa oom mow mow | Rivingtons | Rock N Roll | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |

[Play]  [Stop]

Volume  L  R

Current Time: 06:54 pm

PlayList Player

File  Options  Tables  Help

Recorder | PlayList Editor | PlayList Player | Reports

PlayList Player | Change PlayList | Title [Dinner music 1] | Total Play [1:38:45]

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Rock N Roll | | 4/9/97 | 4:26 |
| Surfer Girl | Beach Boys | Rock N Roll | | 4/9/97 | 6:42 |
| My heart is calling | Houston, Whitney | Pop | | 4/29/97 | 10:57 |
| Papa oom mow mow | Rivingtons | Rock N Roll | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/8/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |
| Ride the wild surf | Jan & Dean | Rock N Roll | | 5/1/97 | 35:54 |
| Surfer Girl | Beach Boys | Rock N Roll | | 4/9/97 | 38:10 |
| The little old lady | Jan & Dean | Rock N Roll | | 4/21/97 | 40:40 |
| Let it flow | Braxton, Toni | Pop | Audio only | 4/18/97 | 45:07 |
| Surfin' Safari | Beach Boys | Rock N Roll | | 4/9/97 | 47:10 |
| I believe in you and me | Houston, Whitney | Bluegrass | | 4/29/97 | 51:12 |
| Papa oom mow mow | Rivingtons | Rock N Roll | | 4/29/97 | 53:30 |
| Surfin' bird | Trashmen | Rock N Roll | | 4/21/97 | 55:49 |
| Exhale | Houston, Whitney | Pop | Audio and video | 4/9/97 | 59:14 |
| Wipe out | Surfaris | Rock N Roll | | 4/21/97 | 1:01:31 |
| Pipeline | Chantays | Rock N Roll | | 4/21/97 | 1:03:45 |
| Count on me | Houston, Whitney | Pop | Audio only | 4/18/97 | 1:08:12 |
| Surf City | Jan & Dean | Rock N Roll | | 4/21/97 | 1:10:43 |
| I believe in you and me | Houston, Whitney | Bluegrass | | 4/29/97 | 1:14:45 |
| Surfin' Safari | Beach Boys | Rock N Roll | | 4/9/97 | 1:16:48 |

Play  Stop  Pause

Volume L  R

Current Time: [07:07 pm]  Time Complete: [08:24 pm]

LIST BUILDING SYSTEM

This is a divisional of U.S. patent application Ser. No. 10/841,374, filed on May 7, 2004 now abandoned, which is a continuation of U.S. patent application Ser. No. 09/770,882 filed on Jan. 26, 2001, now U.S. Pat. No. 6,763,345 issued Jun. 14, 2004, which is a continuation of U.S. patent application Ser. No. 08/859,995 filed on May 21, 1997, now U.S. Pat. No. 6,243,725 issued Jun. 5, 2001.

FIELD OF THE INVENTION

The invention pertains to software driven systems and methods for developing audio/video sequences. More particularly, the invention pertains to such system and methods wherein a user can create an editable list of works which can be presented.

BACKGROUND OF THE INVENTION

With the advent of CDs a wide variety of music, music videos or video sequences are conveniently available for a user in a non-analog, digital format. The advantages of digital recording of both audio and video have been recognized and are to a great extent realized with the ready availability of pre-recorded CDs.

While convenient, pre-recorded CDs present a problem to a user in that while it is possible to select sequentially between the pre-recorded works on a given CD, to switch to another artist or group it is necessary to have multiple drives available or to remove one CD and insert another at the appropriate time. While possible, such arrangements are at the very least inconvenient. In addition, because of the delays inherent in switching from one CD to another, the audio or video output might be lost for an undesirably long period of time thereby detracting from the ambiance afforded by the performance. In addition, listeners at times are only interested in one or two of the tracks on a CD in a given situation.

There thus continues to be a need for systems and methods which will make it possible to combine works by a variety of performers or artists in a relatively arbitrary fashion and to present those works in a given sequence in a fashion that is convenient but which at the same time is cost effective. It would also be desirable to be able to use widely available personal computers as control elements in such systems.

SUMMARY OF THE INVENTION

A system and a method of arranging media elements for later replay make it possible to create new sequential presentations of the elements. The elements can be obtained from a local medium such as a CD, or a video tape. Alternately, the elements can be obtained from a remote location via wired or wireless transmission. Elements can include audio works such as music or audio/visual works including advertisements, music videos or other types of elements.

The elements can be stored on a readable digital storage medium. Some or all of the elements can be played back or performed individually.

A collection of separate elements can be identified and arranged. One form of arrangement is a list. Another is a non-linear tree-like arrangement.

The collection can be played back or performed sequentially as specified in a list. Alternately, the elements can be performed interactively as specified in a tree. In this embodiment, tree nodes represent decision points for a viewer or a listener.

A graphically-oriented editor is provided for building or editing lists or trees. The lists or trees can be stored and subsequently retrieved for editing or performing the collected media elements.

Output can, in one aspect, be an audible or a visible performance of the elements in accordance with a selected list or tree. In another aspect, the collection can be written to a medium. Hence, a CD or other digital medium can be written, or audio or video tapes can be recorded. The output medium is not a limitation of the invention.

In yet another aspect, a system incorporating a card reader or a vending unit can be used to build a list of elements. In this instance an appropriate credit needs to be established before an element can be added to an on-going collection being performed.

Subsequent to a credit being established and a selection or selections made in accordance with the credit, elements can be added to the list and performed. Elements can be exclusively audio. Alternately, elements can include both audio and video components without limitation.

In yet another aspect, the method includes building a list of media elements which can come from a variety of sources. Preferably, the media elements are storable in a digital format.

Subsequently, the list can be reviewed visually by a user and either modified or edited for the purpose of creating a sequence of media elements to be replayed or presented. Subsequently, the list is executed and the elements are either presented audibly or visually or both in accordance with their characteristics.

In a further aspect, a digitized inventory of media elements can be created by either reading a local digital medium, such as a CD ROM or by receiving, via wireless transmission, digitized sequence of works which can then be stored in the inventory. If desired, the user can preview some or all of any element in the inventory.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 4A through 4K illustrate various screens presentable by the control program illustrated in FIGS. 3A through 3P;

DETAILED DESCRIPTION OF THE PREFERRED EMBODIMENTS

Figure 1:
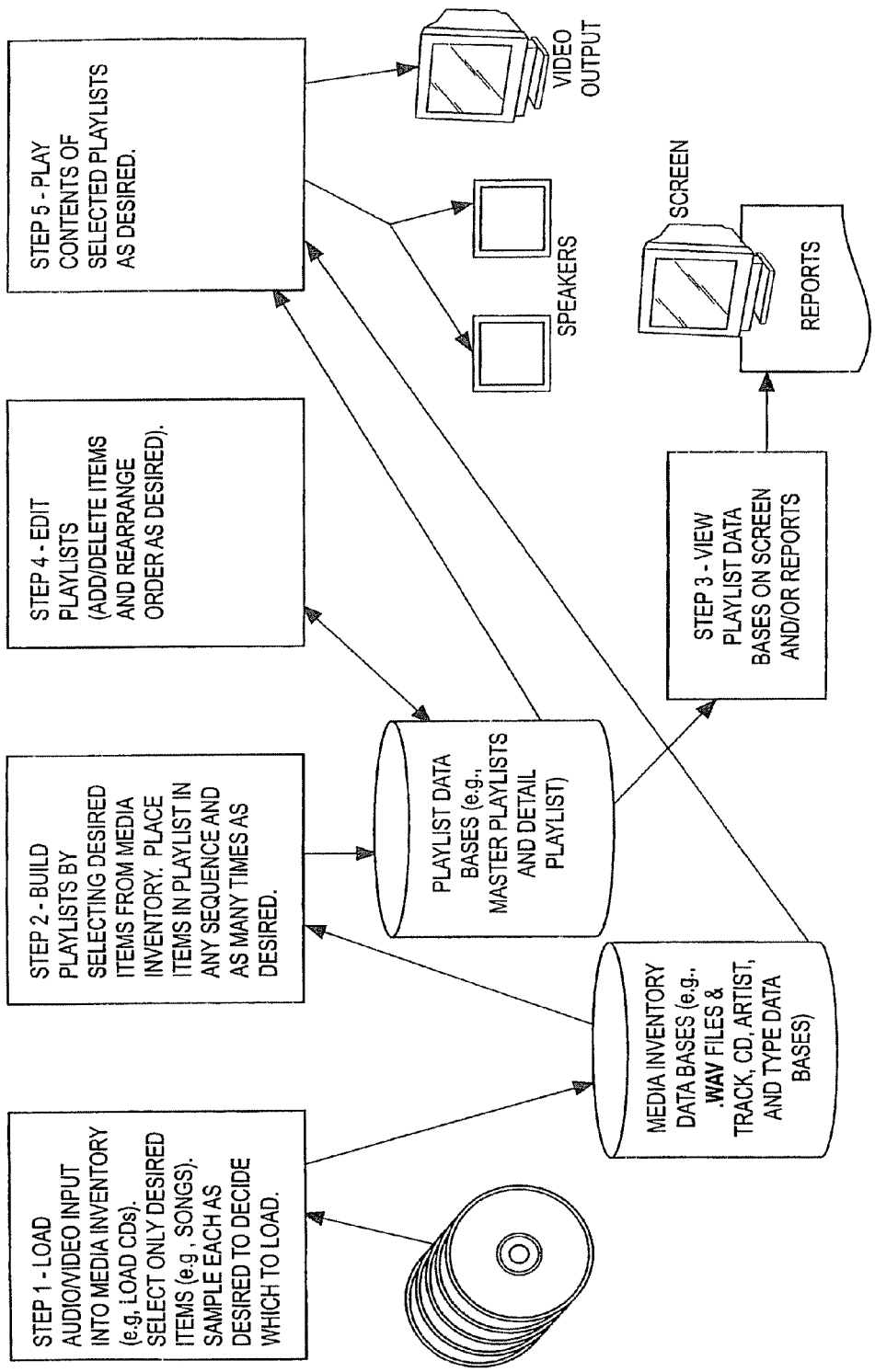
FIG. 1 is an overall flow diagram of a method in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Systems and methods which embody the present invention enable the user to acquire, for example, digitized audio or audio and video works, which are of interest and which are to be represented either in real time as an audio or an audio/visual work or to be written onto a digital storage medium as part of a sequence selected by the user. Functional capability is provided enabling the user to create one or more composite play or presentation lists which incorporate a plurality of titles or designations of the works in a user selected order. The works could come from a variety of different sources and could include other types of sensory outputs without limitation.

As part of the list preparation process, the user can listen to or view some or all of any of the works. A new list can be graphically created. An existing list can be edited to revise existing works identified in the list, change the order of presentation or to add new ones. Subsequently, the list can be executed and the works performed.

Execution of the list will present the works in the determined sequential order audibly or visually and audibly depending on the nature of the work. Alternately, the works represented on the list can be written to a digital storage medium, such as a CD or DVD for subsequent presentation.

FIG. 1 illustrates steps of a method 10 for preparing executable playlists in accordance with one aspect of the invention. In an initial step, selected audio or video elements can be loaded into a digital database, a media inventory, for review and subsequent presentation. Media elements can be obtained from locally played sources or by wireless signals received from a remote source, such as via an antenna, which are demodulated and stored in digital form in the media inventory.

In the next step, a plurality of playlists can be created by graphically selecting media elements to be entered into a selected list from the inventory. As part of the step, one or more playlist records can be built and stored.

In a subsequent step, the lists in the playlist database can be viewed and various reports concerning the subject list can be created.

In a subsequent step, one or more of the lists can be graphically edited thereupon rearranging items in a list, adding items or deleting items as desired.

Finally, a particular list can be selected and executed. Audio works are presented sequentially, in accordance with the selected list, via audio output transducers, typically speakers. Video works or audio/video works or presented in accordance with the selected list on a video display in combination with speakers.

If desired, a selected list or lists can be written to a storage medium such as a CD ROM for later use. If desired, the associated media elements can also be written on to the medium.

A variety of services can be provided to a user while carrying out the steps of the method 10. Analysis can be conducted of the characteristics of various works. For example, beats per minute can be determined and audio works can be sorted accordingly. A list or lists can be created in accordance with a pre-selected tempo or beats per minute.

Sorting or selecting based on other features of audio or video characteristics of the works can also be included. Presentations via a selected list can be controlled based on selected features.

For record keeping purposes, the number of times a given media element is presented or executed can be logged along with date and time information. Reports reflecting any lists created based on any of the above selection features or characteristics can also be printed for invoicing, billing or royalty payment purposes.

Figure 2:
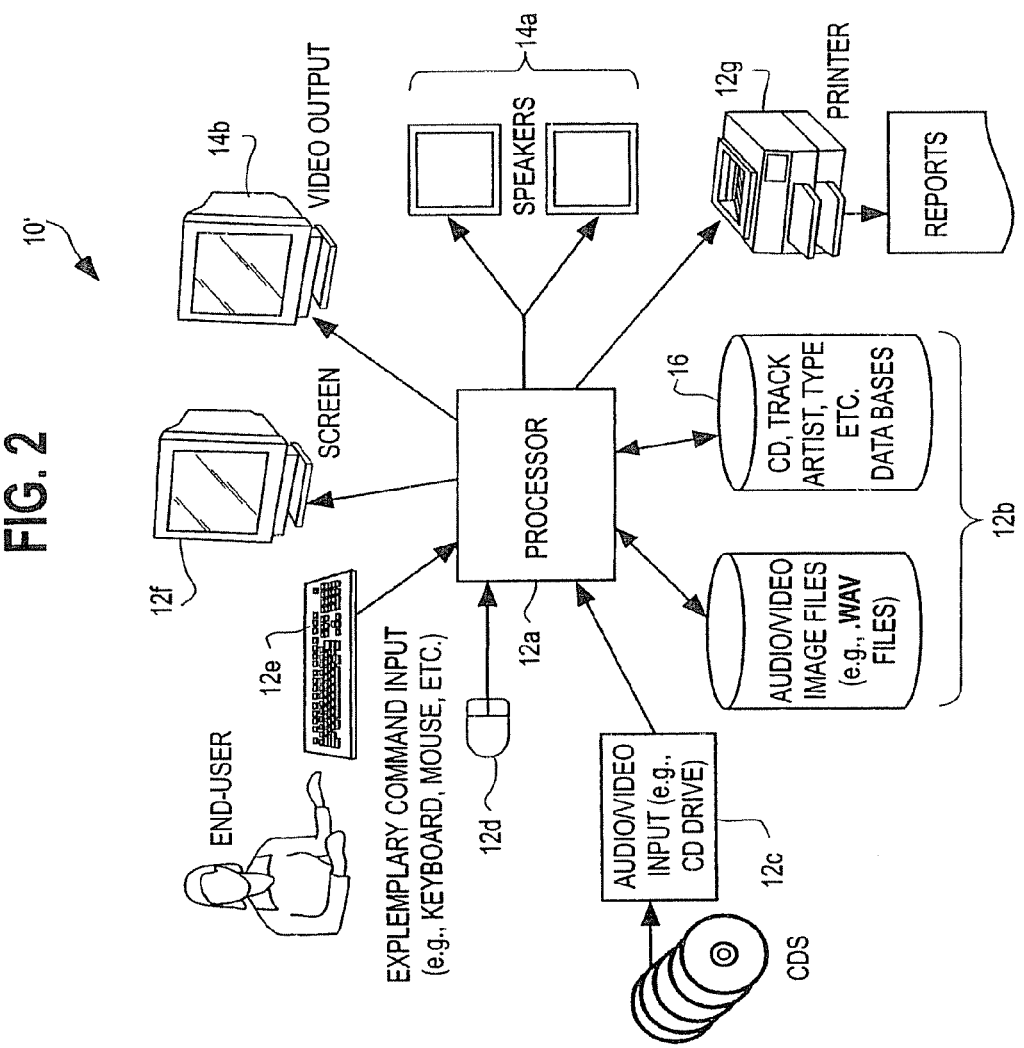
FIG. 2 is a block diagram of a system useable for practicing the method of FIG. 1.

FIG. 2 illustrates in block diagram form a system 10' for implementing the method 10 of FIG. 1. The system 10' incorporates a programmable processor 12a, for example, a personal computer of a selected variety. Coupled to the processor 12a is a mass digital storage medium 12b, such as a hard disk drive for storage of various databases and programs.

Coupled to the processor 12a is a source of digitized audio or audio/visual input signals such as a CD ROM drive 12c. Media elements or works can also be received wirelessly. Also coupled to the processor 12a are user input devices such as a mouse 12d and a keyboard 12e. Other input devices could also be used without limitation.

Output devices include a display screen 12f of a type conventionally used with programmable processors to present visual display of ongoing programs being executed to the user. A printer 12g is available to provide reports.

Audio and video output devices for media elements include speakers 14a and video output device 14b which can be of a size and quality suitable for the type of works being displayed. Other output devices could also be used.

The hardware components of the system 10' interact in accordance with the user inputs and under the control of a control program 16 stored in one of the storage devices 12b.

The control program 16 includes pre-created commands for carrying out the method 10 illustrated in FIG. 1. The control program 16 is described in a set of flow diagrams illustrated in FIGS. 3A . . . 3M. FIGS. 4A-4K illustrate various exemplary displays presented on the display unit 12f while the control program 16 is executing.

Figure 3A:
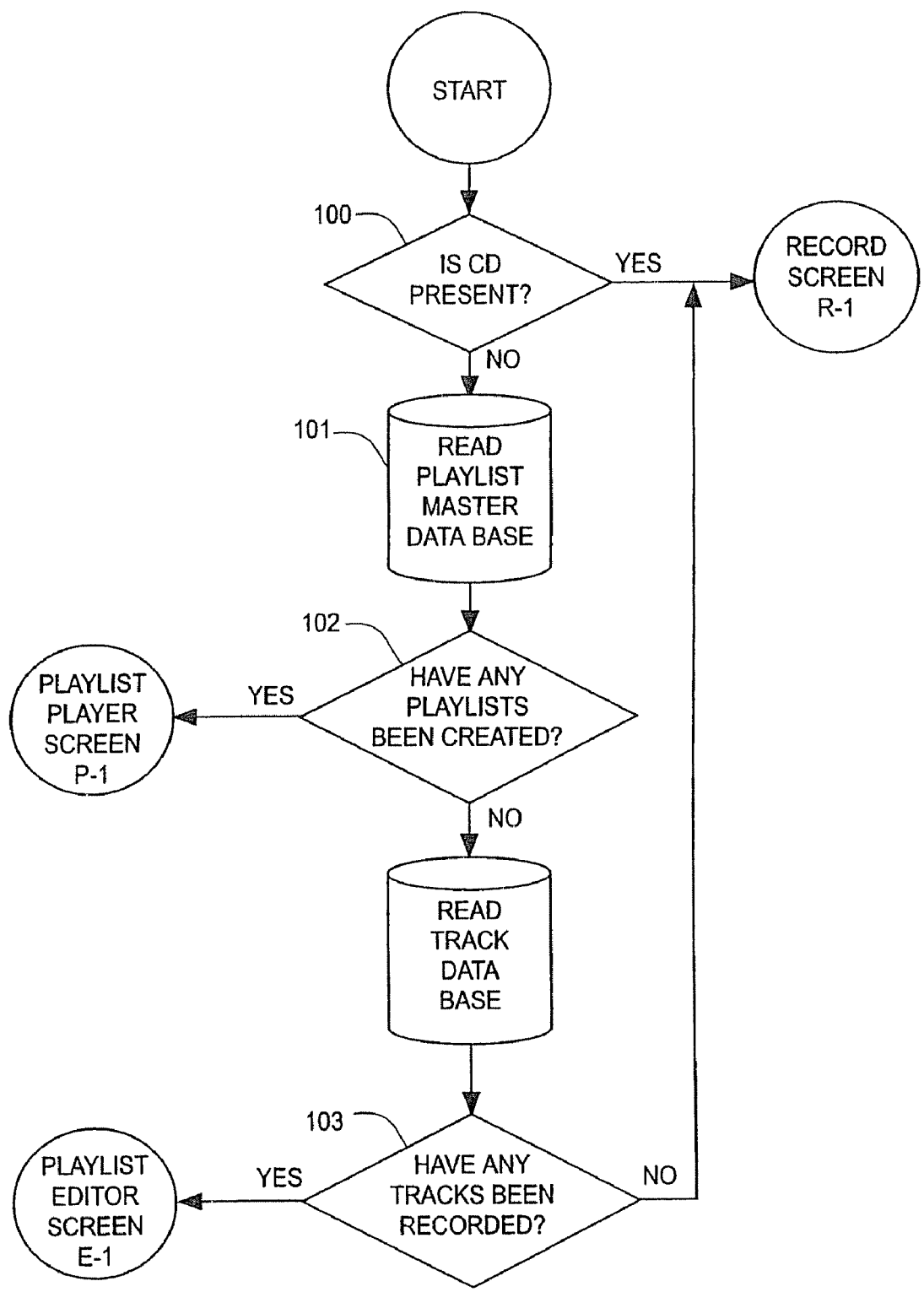
FIGS. 3A through 3P taken together illustrate a flow diagram of a control program useable with the system of FIG. 2.
Figure 3B:
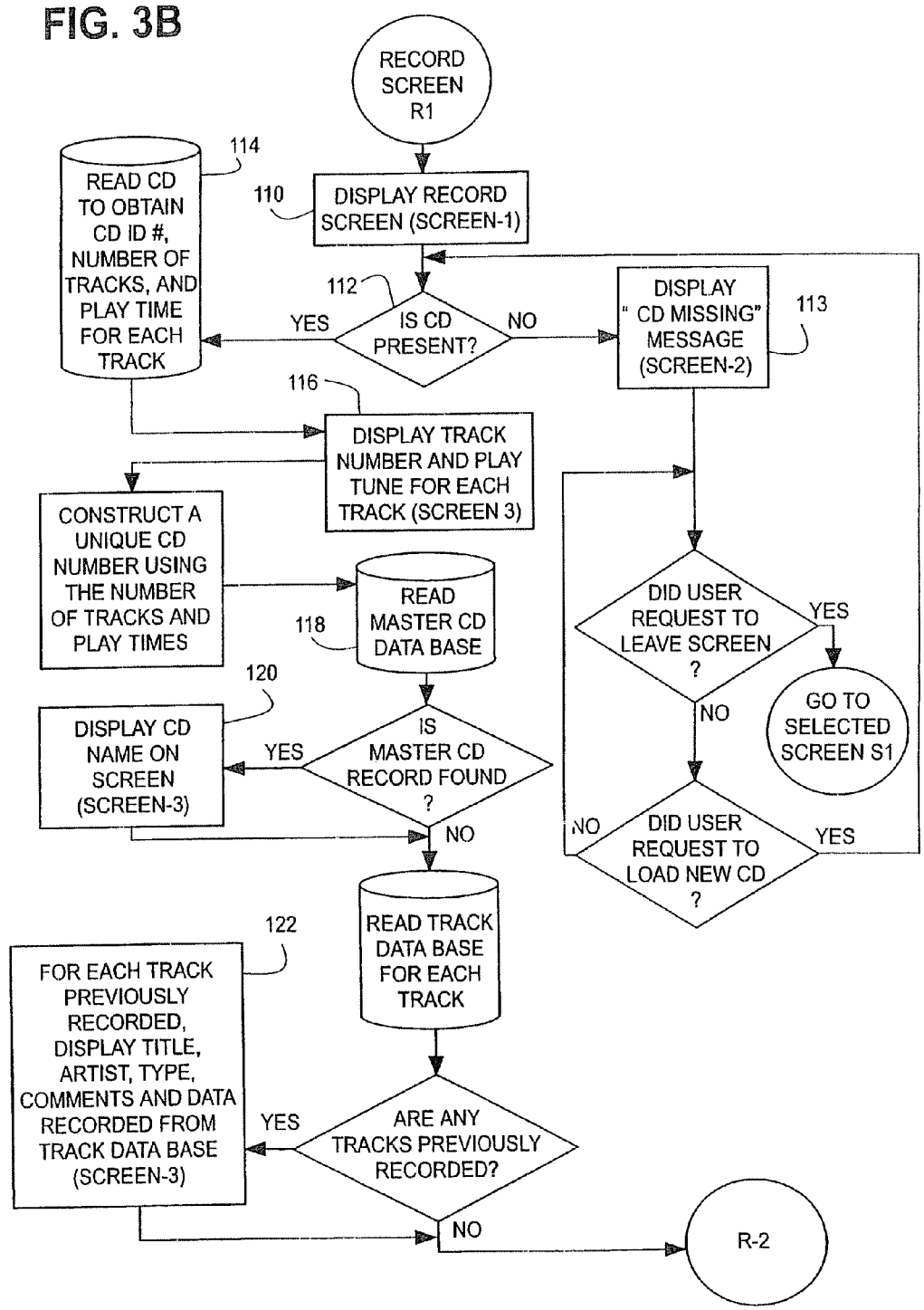
Figure 3C:
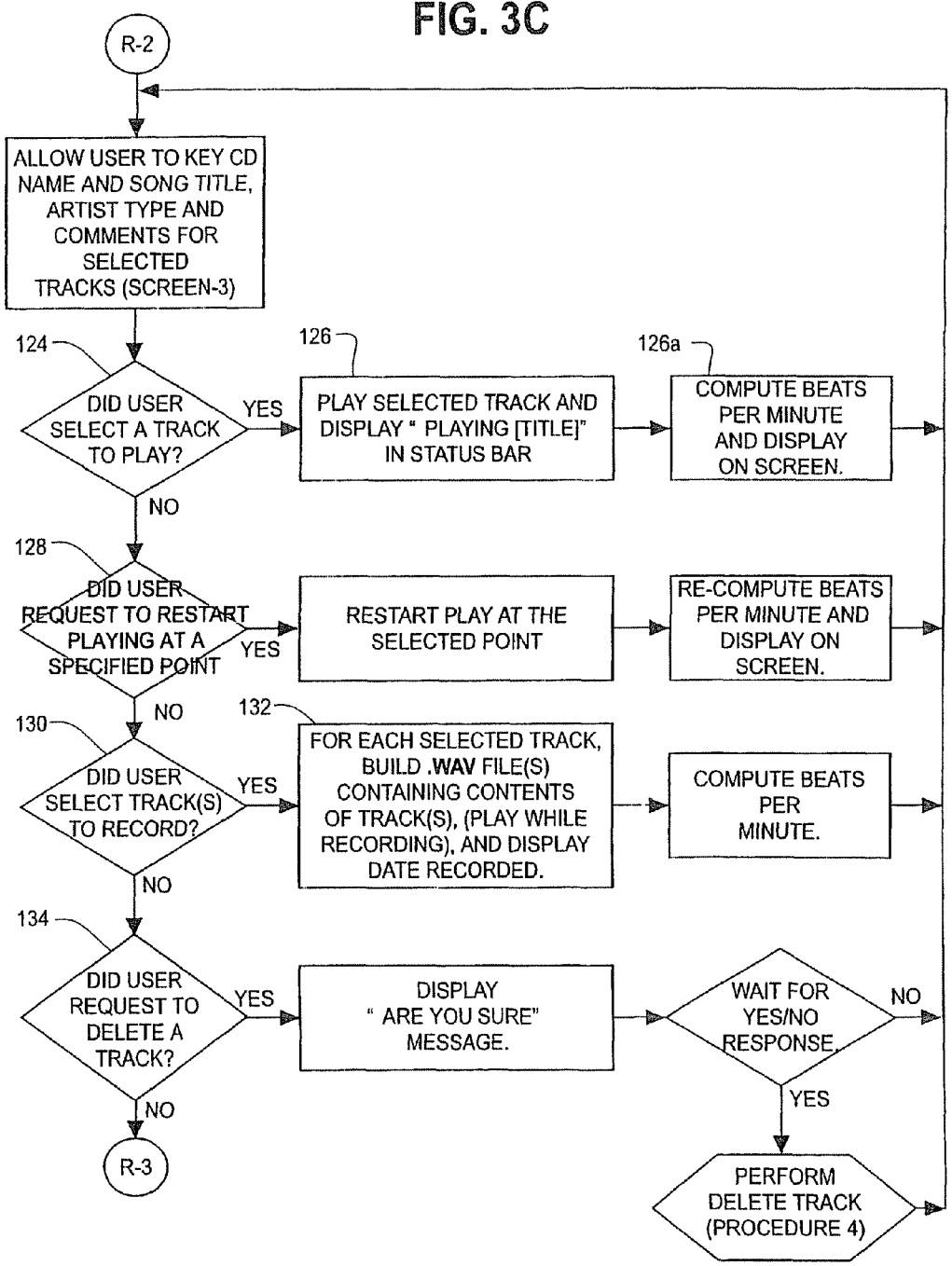
Figure 3D:
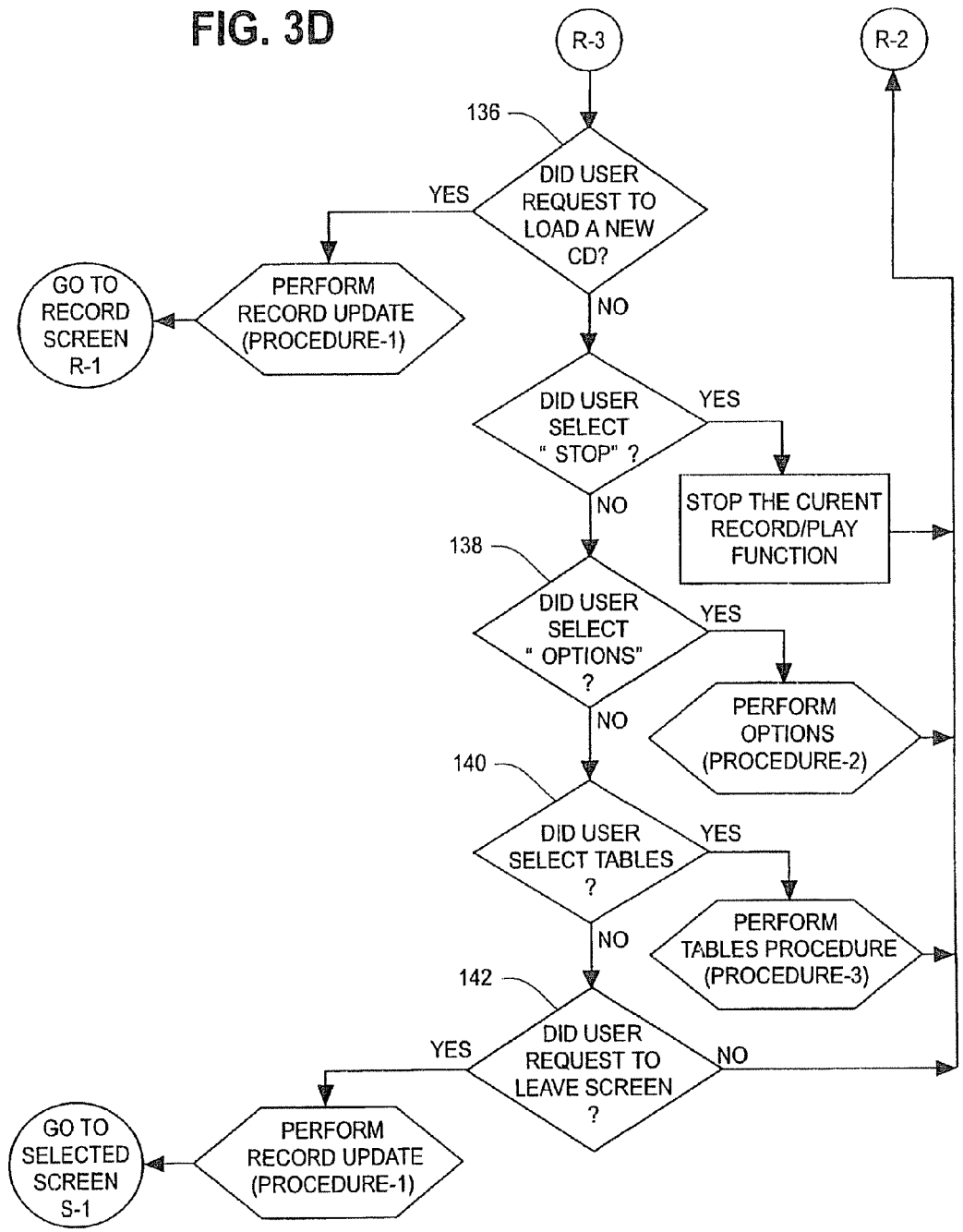
Figure 3E:
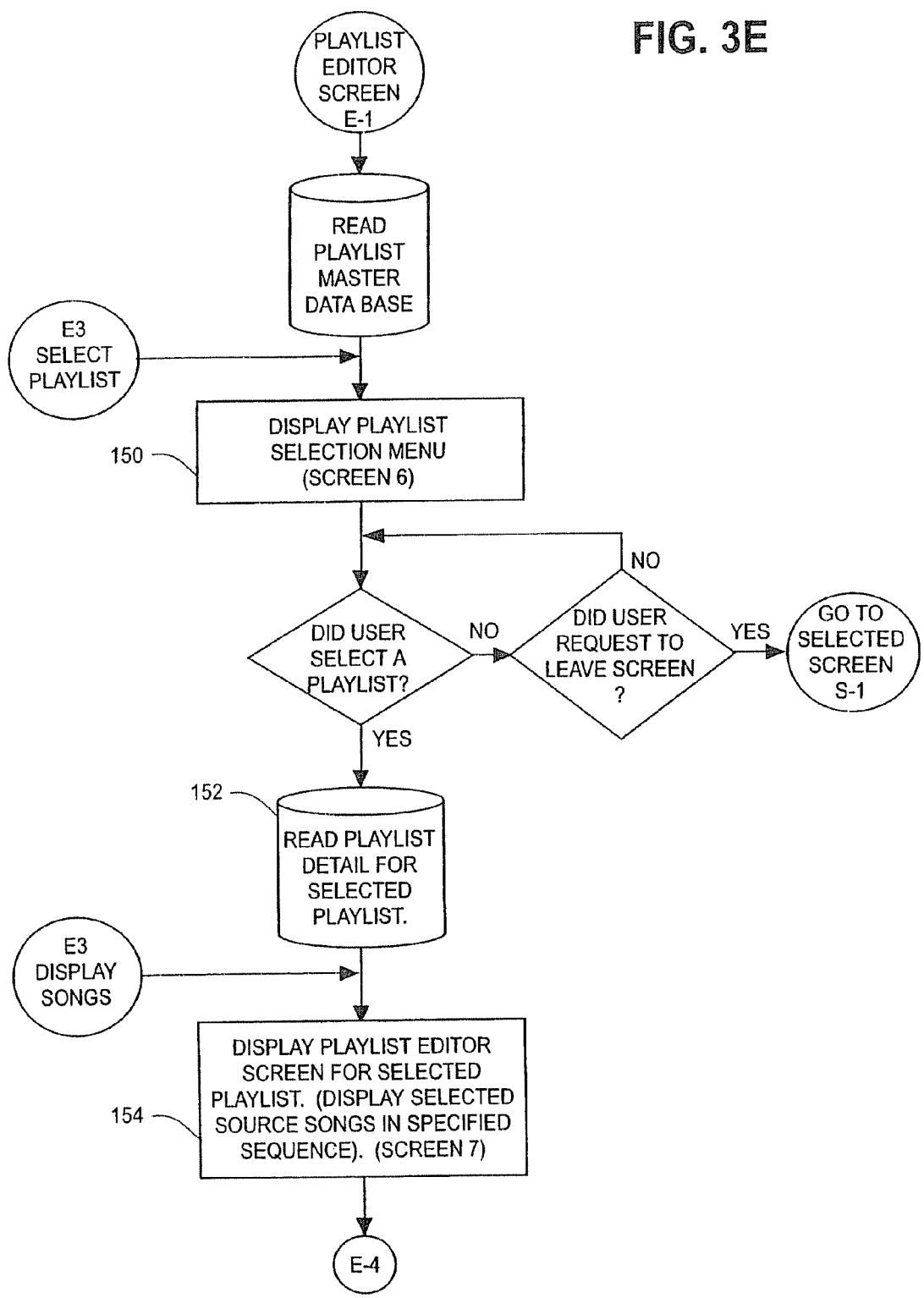
Figure 3F:
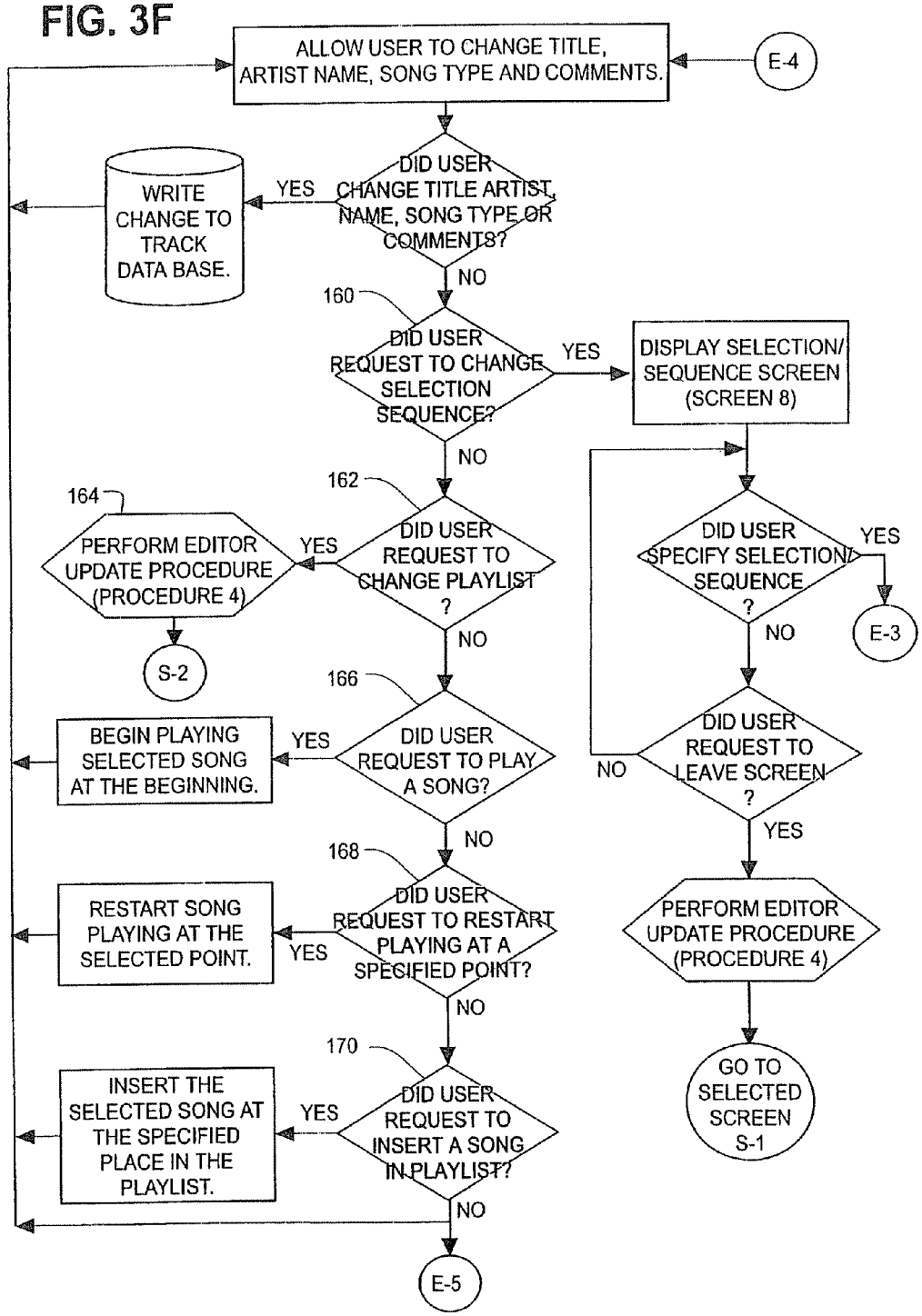
Figure 3G:
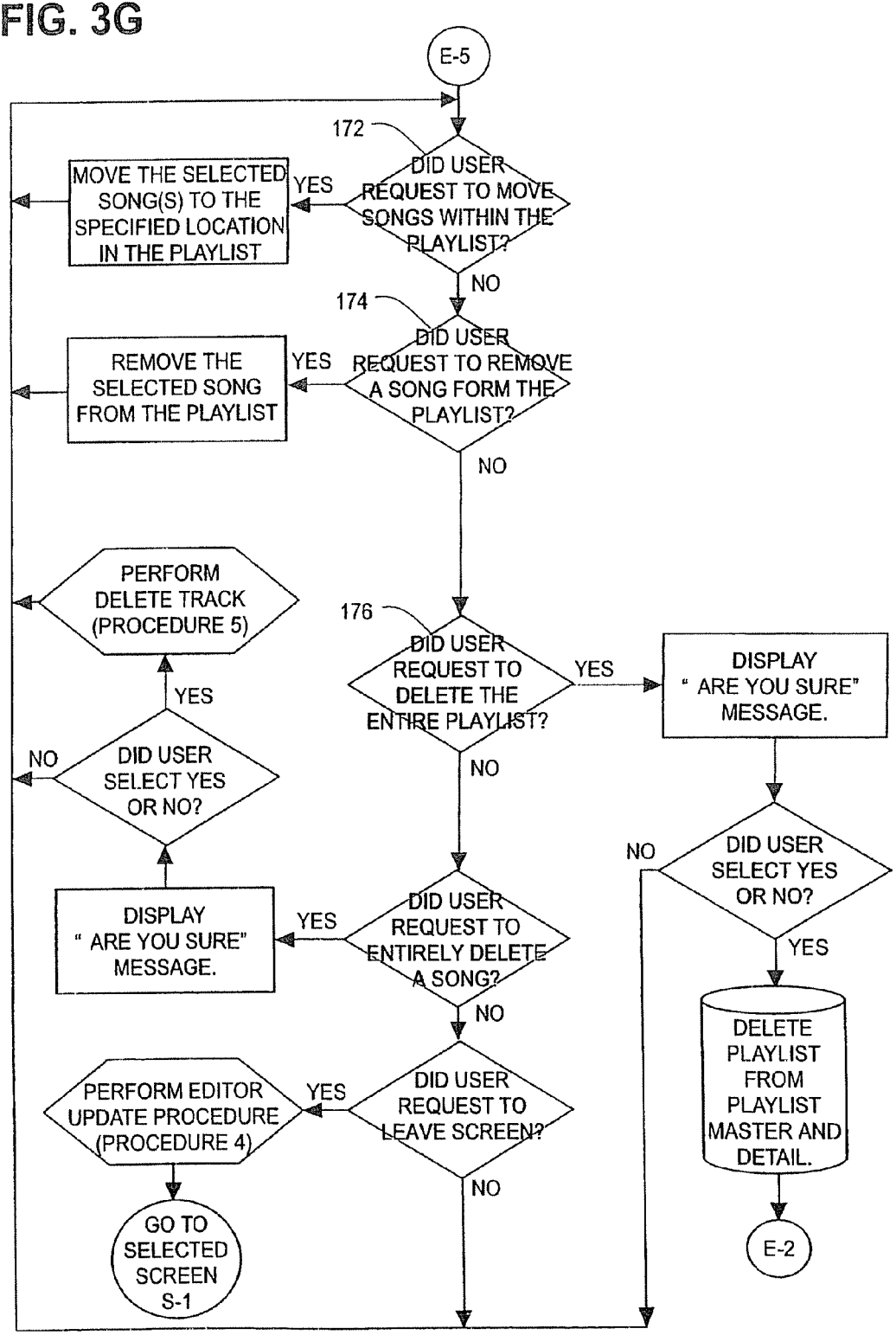
Figure 3H:
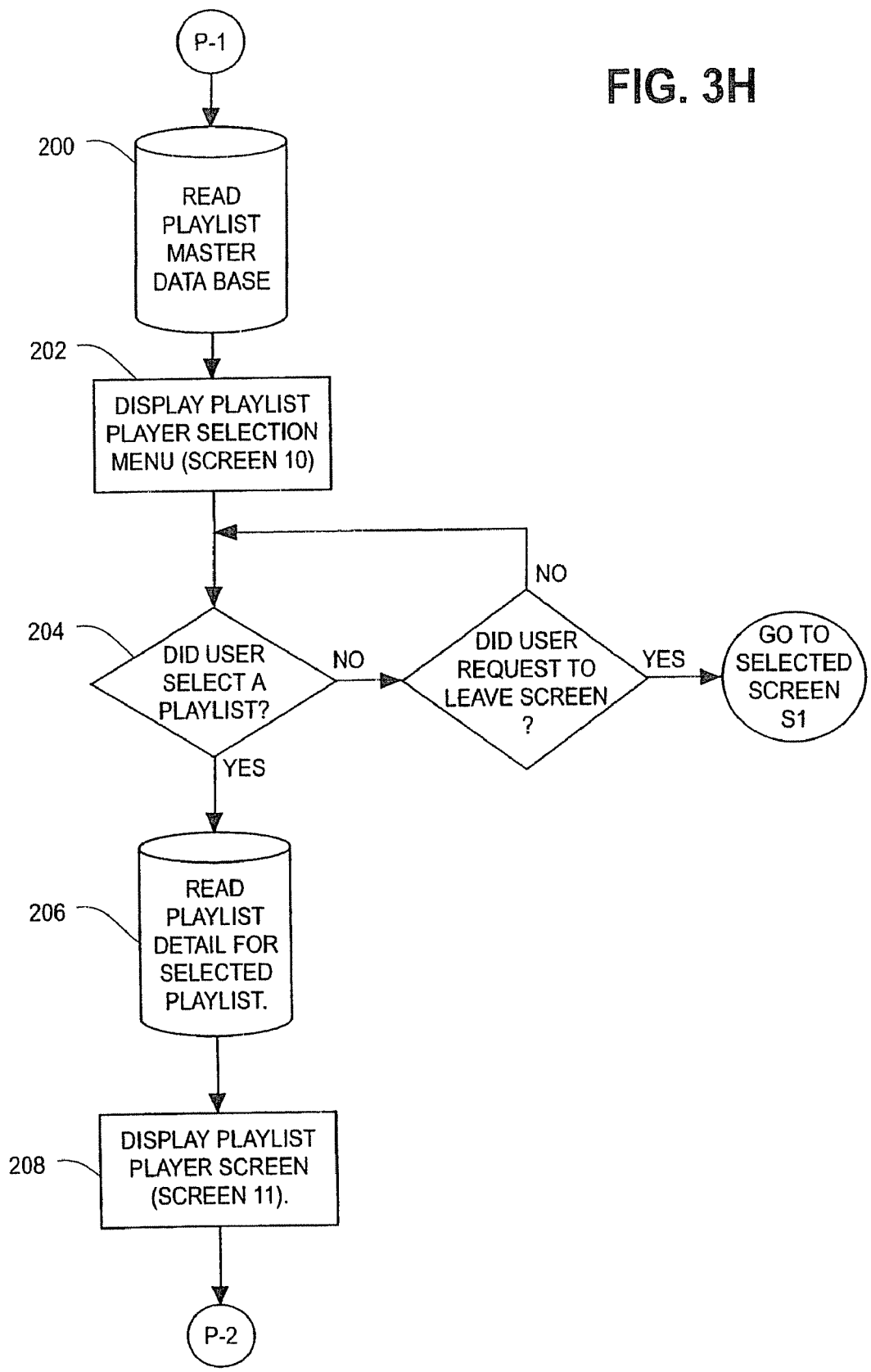

FIG. 3A illustrates the initial steps in reading a source of digitized works, such as a CD and in selecting either the record sequence, FIGS. 3B, 3C, and 3D, the list player sequence FIGS. 3H and 3I, or the playlist editor sequence FIGS. 3E, 3F and 3G. In step 100 a determination is made if a CD is present in the drive 12c. If so, the program 16 initiates record steps illustrated in FIGS. 3B, 3C and 3D. If not, the playlist master database is checked in a step 101. If playlists had previously been created, the playlist screen sequence is executed, FIGS. 3H and 3I in step 102. Alternately the editor sequence can be entered, FIGS. 3E, 3F and 3G in step 103.

Figure 4A:
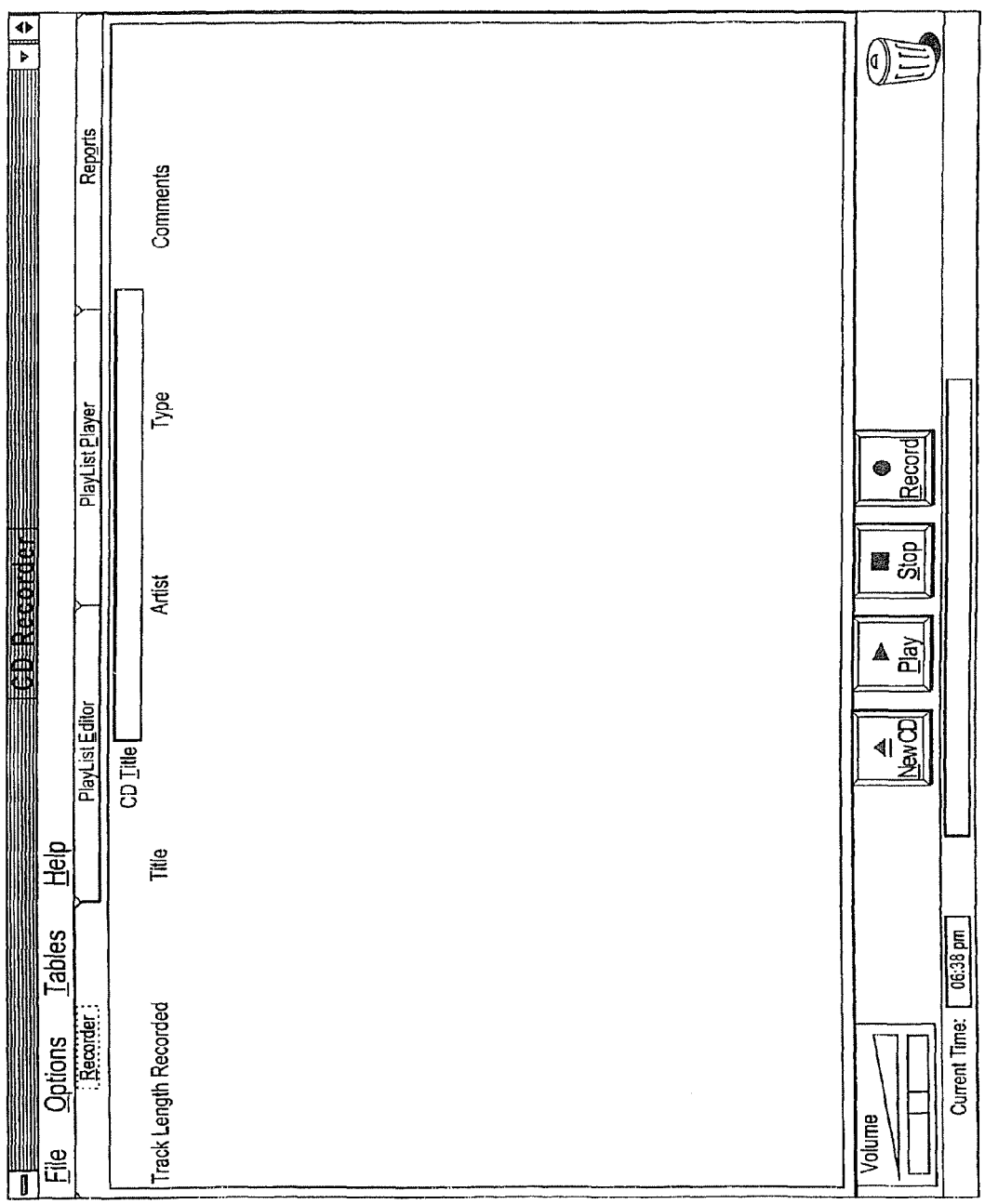
Figure 4B:
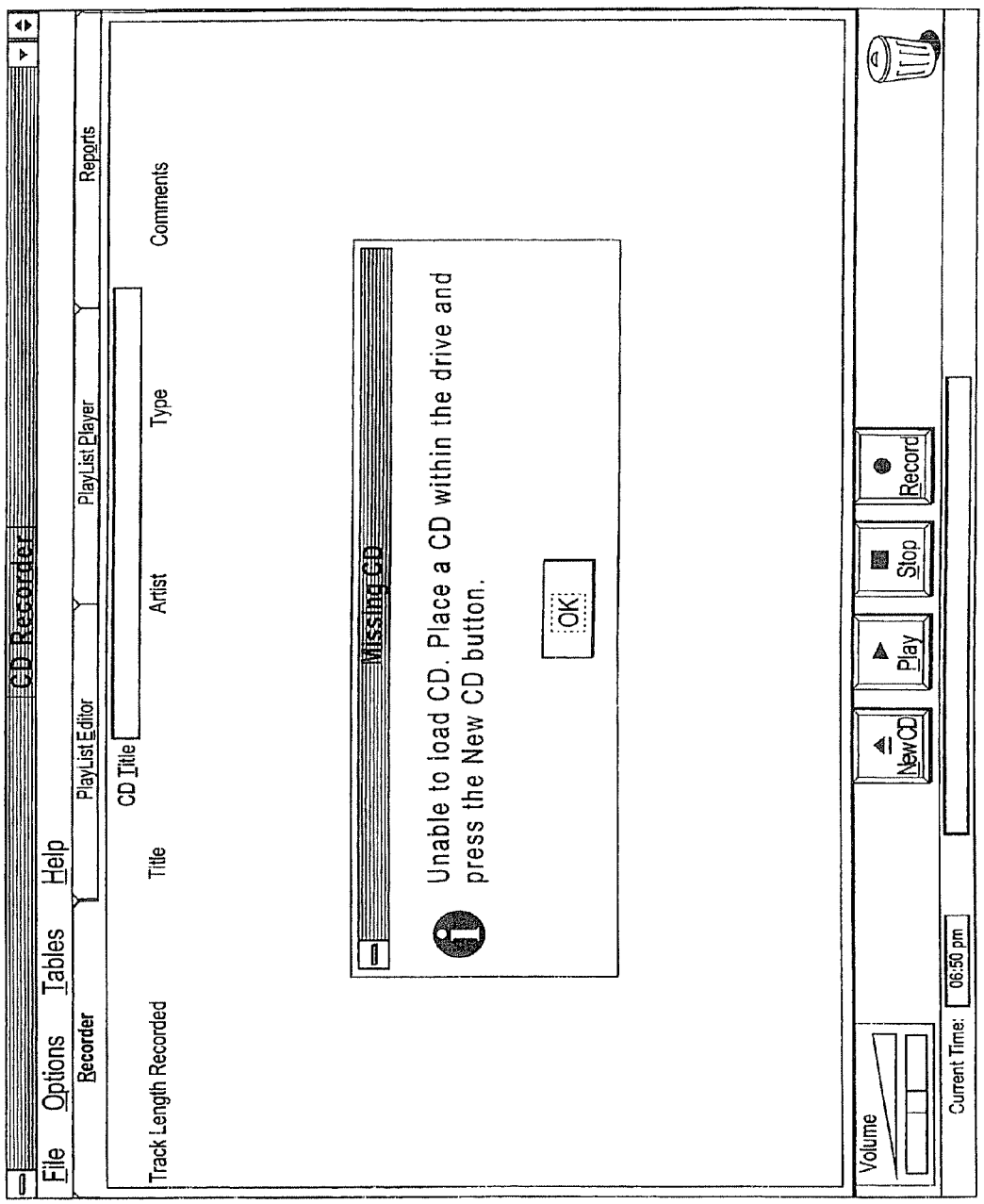

With respect to the record sequence FIG. 3B, during the process of recording information off of the respective CD, in a step 110 an initial screen, FIG. 4A is displayed. If the processor 12a determines in a step 112 that a CD is not present, then a CD missing display, FIG. 4B is presented in a step 113.

Figure 4C:
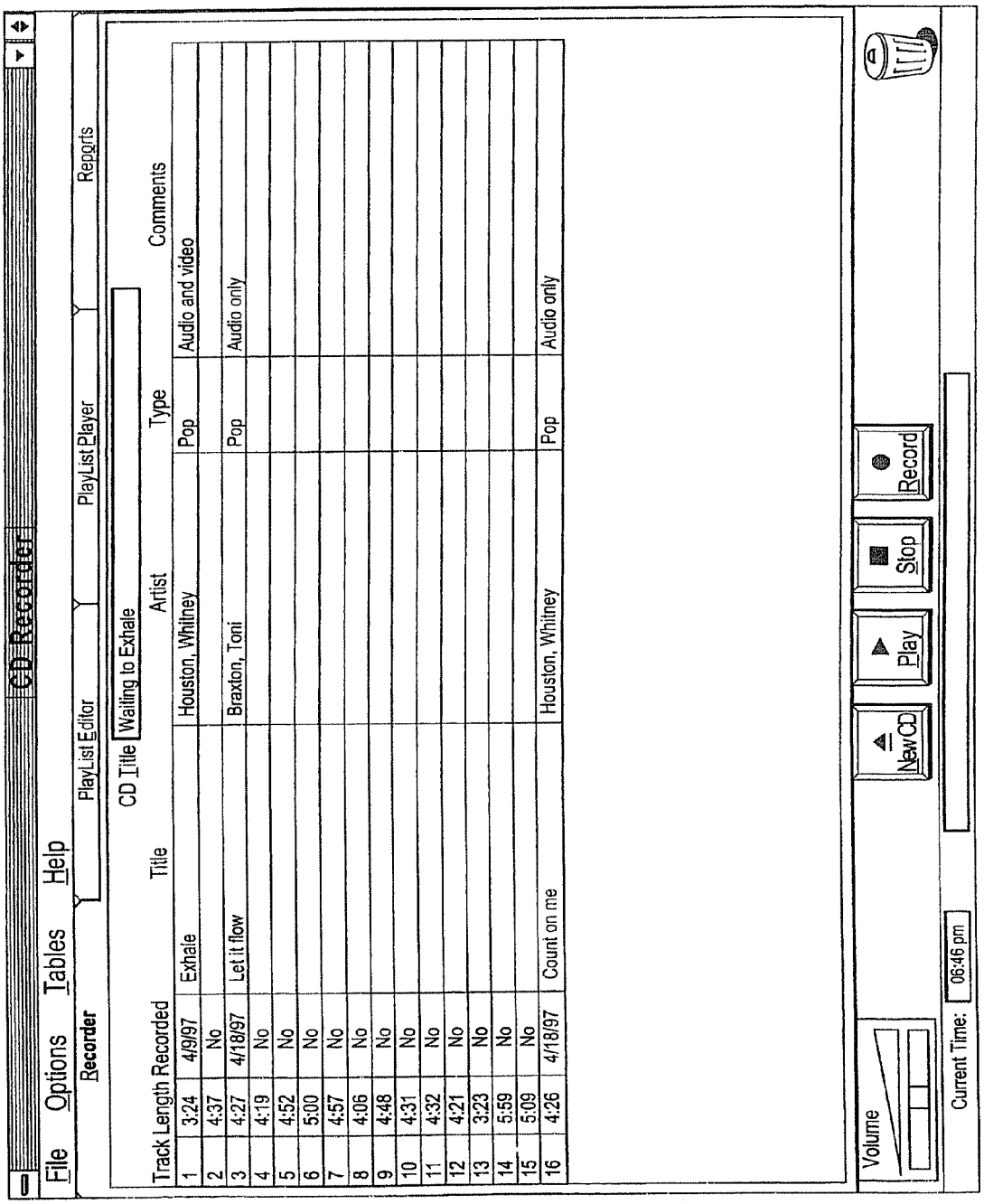
Figure 4D:
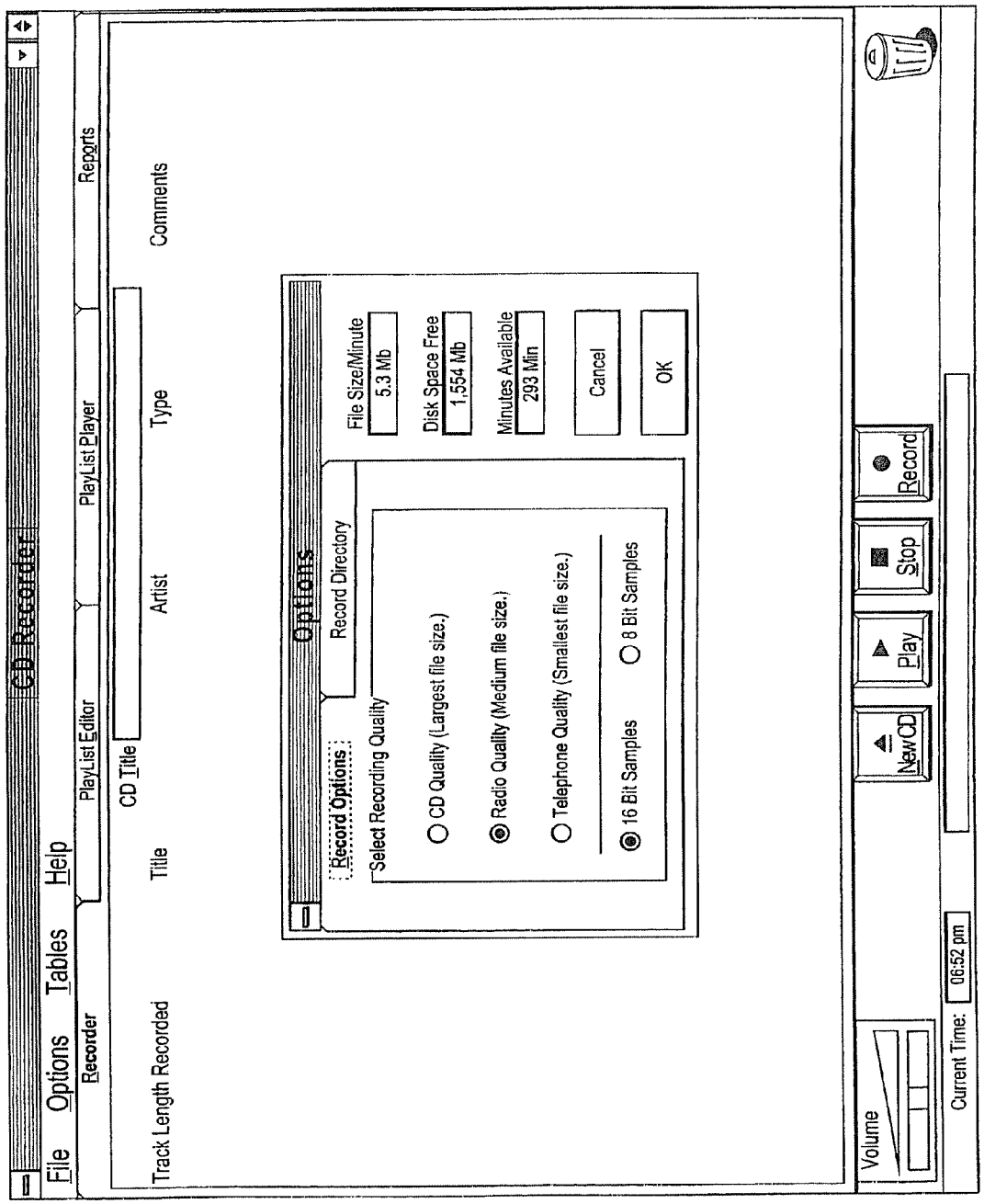
Figure 4E:
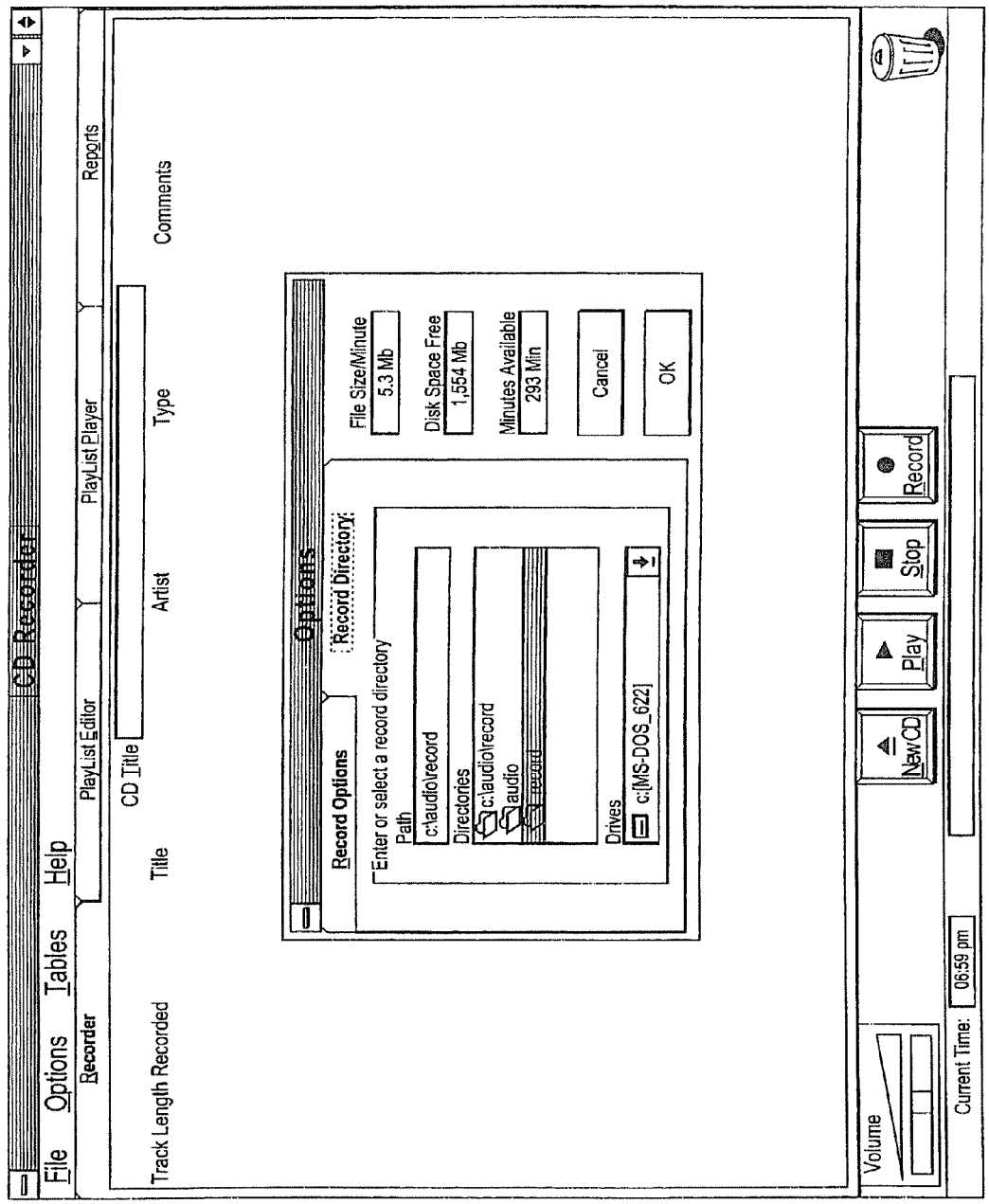
Figure 4F:
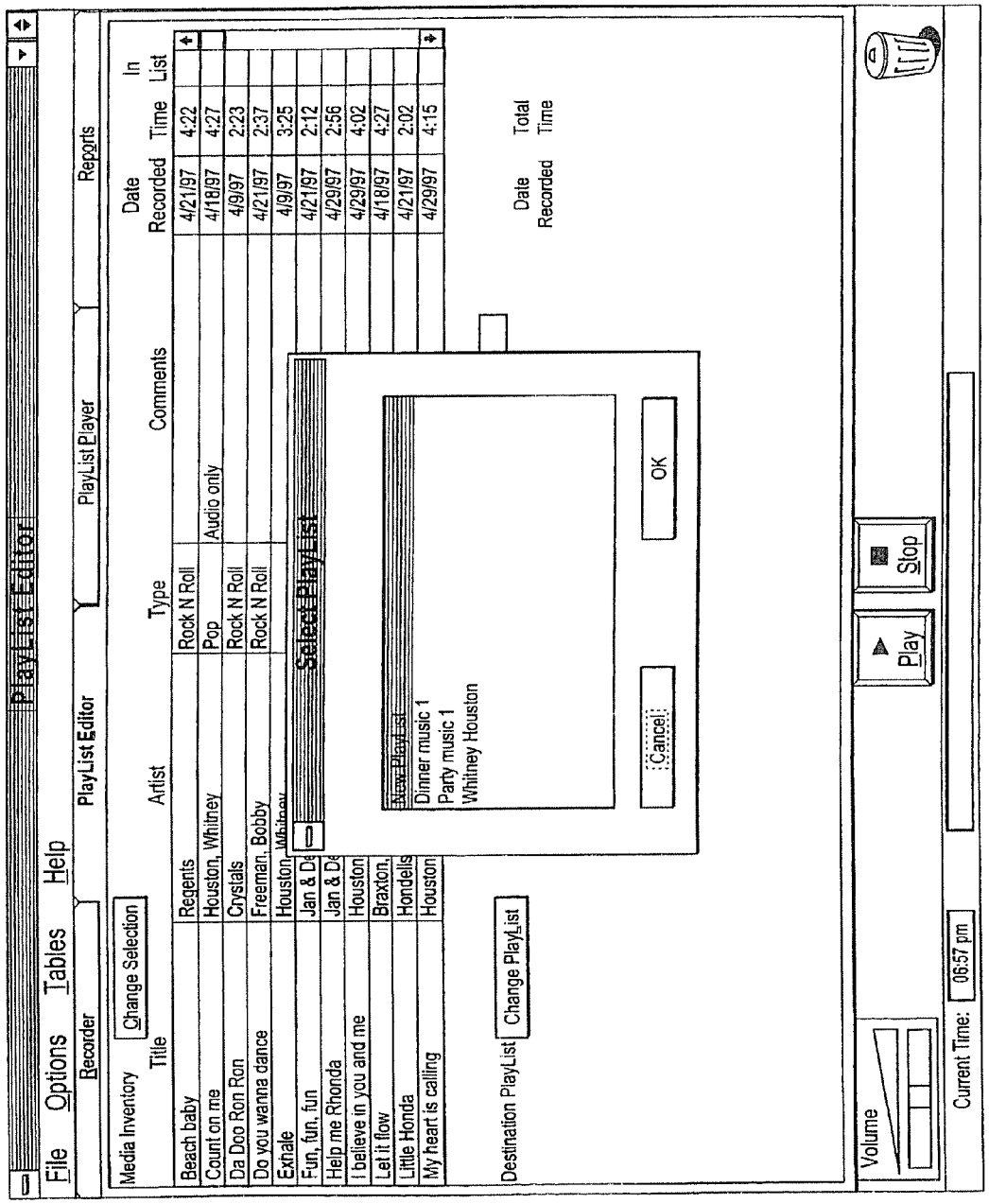

In the event that a CD is present, in a step 114, information will be read off of it as to track numbers and play times and displayed in a step 116 as in FIG. 4C. In a step 118, the master CD database is checked and if a corresponding record is found, in a step 120 the name of the CD is displayed, as indicated in FIG. 4C. Where tracks off of the respective CD had been previously recorded, in step 122, that information will be retrieved from the track database and displayed also as illustrated in FIG. 4C. The length of each track, recording date, title artist and type of work all can be displayed.

With respect to FIGS. 3C and 3D, in a step 124 the control program 16 determines whether or not the user has selected a track to play. If so, the selected track is played in a step 126. If desired, as illustrated in a step 126a characteristics of the work such as beats per minute can be computed and displayed for the user.

In a step 128, the control program 16 checks to determine whether or not the user requested restart of a work at a specified point. If not the system determines in a step 130 if the user has selected one or more tracks to be recorded. If so, in a step 132, selected tracks are recorded.

The system control program 16 also determines whether or not the user has requested a deletion in a step 134 or requested that a new CD be loaded in a step 136, select options in a step 138, a tables function in a step 140 or an exit function in a step 142. In each of steps 136, 138, 140 and 142, the requested respective procedure is carried out.

Where a user has selected the edit screen, illustrated in FIGS. 3E, 3F and 3G, one or more pre-existing playlists can be retrieved and edited. In a step 150, a playlist selection menu is displayable by the control program 16, in accordance with FIG. 4F. Using the selection menu a particular playlist can be selected and the detail retrieved in a step 152 for the selected playlist. The selected playlist can be displayed for editing as illustrated in FIG. 4G in a step 154. For the convenience of the user, the editor screen, FIG. 4G, illustrates in an upper section, an inventory list of available works currently in inventory which can be selected and entered into the destination playlist, in the lower portion of the display illustrated on FIG. 4G.

Figure 4H:
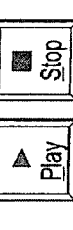

As illustrated in FIG. 3F, in a step 160, a user can edit or revise selections or the sequence of selections in the subject list using an editor selection screen as illustrated in FIG. 4H. In the event that the user requested a change in the play sequence in a step 162, an update procedure is executed in a step 164 corresponding to FIG. 3D and FIG. 4I. It will be understood that standard editing-type functions will be available to the user as would be known to those of skill in the art.

In a step 166 the user can request that a particular selected work be played or presented. The works can be restarted in a step 168 at a particular point.

The user can insert a work or a song in playlist in a step 170. With respect to FIG. 3G, a work or song can be moved within the playlist in a step 172. A particular song or work can be removed from the selected playlist in a step 174. The entire playlist can be deleted in a step 176.

Figure 4I:
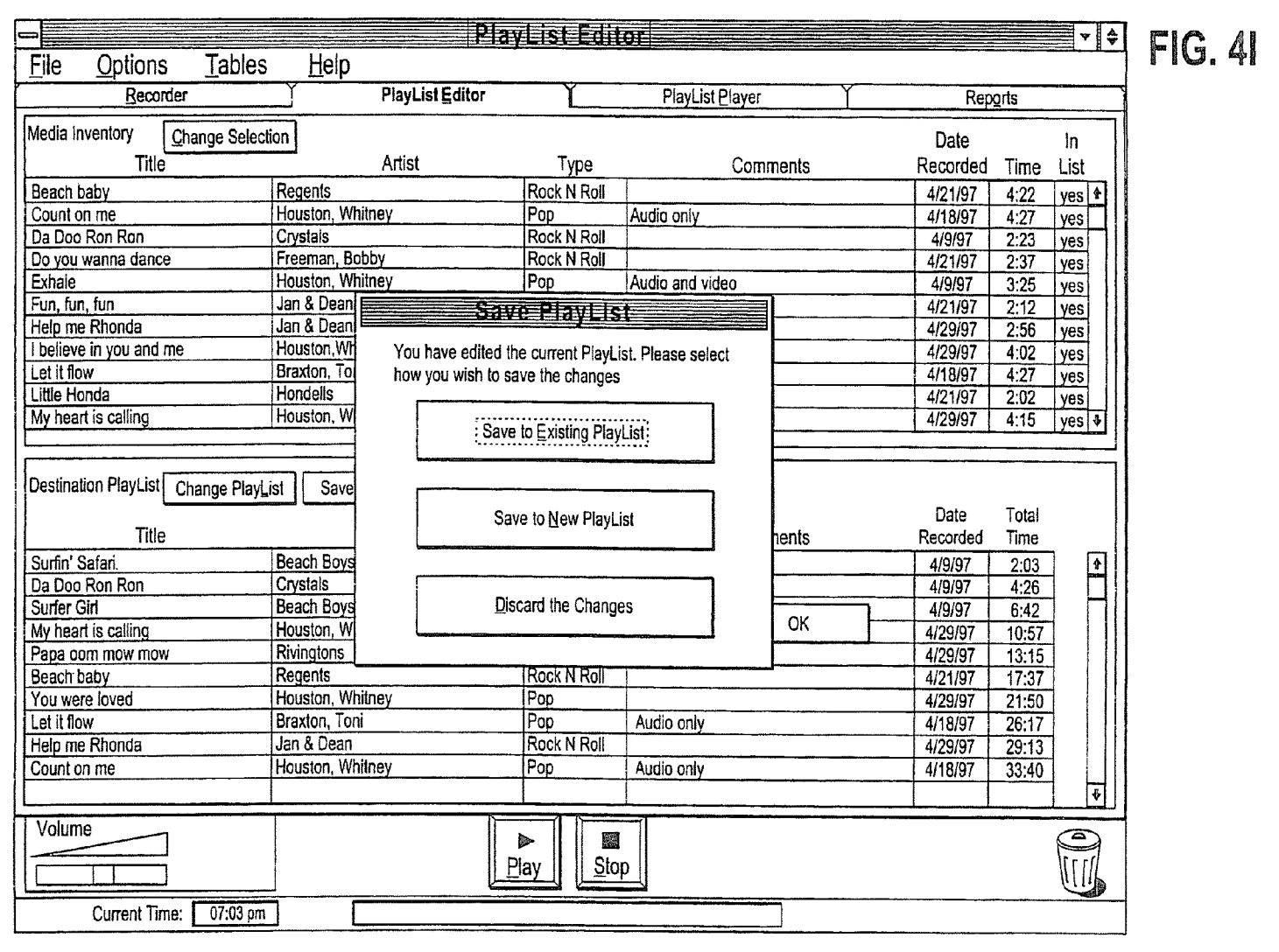
Figure 4J:
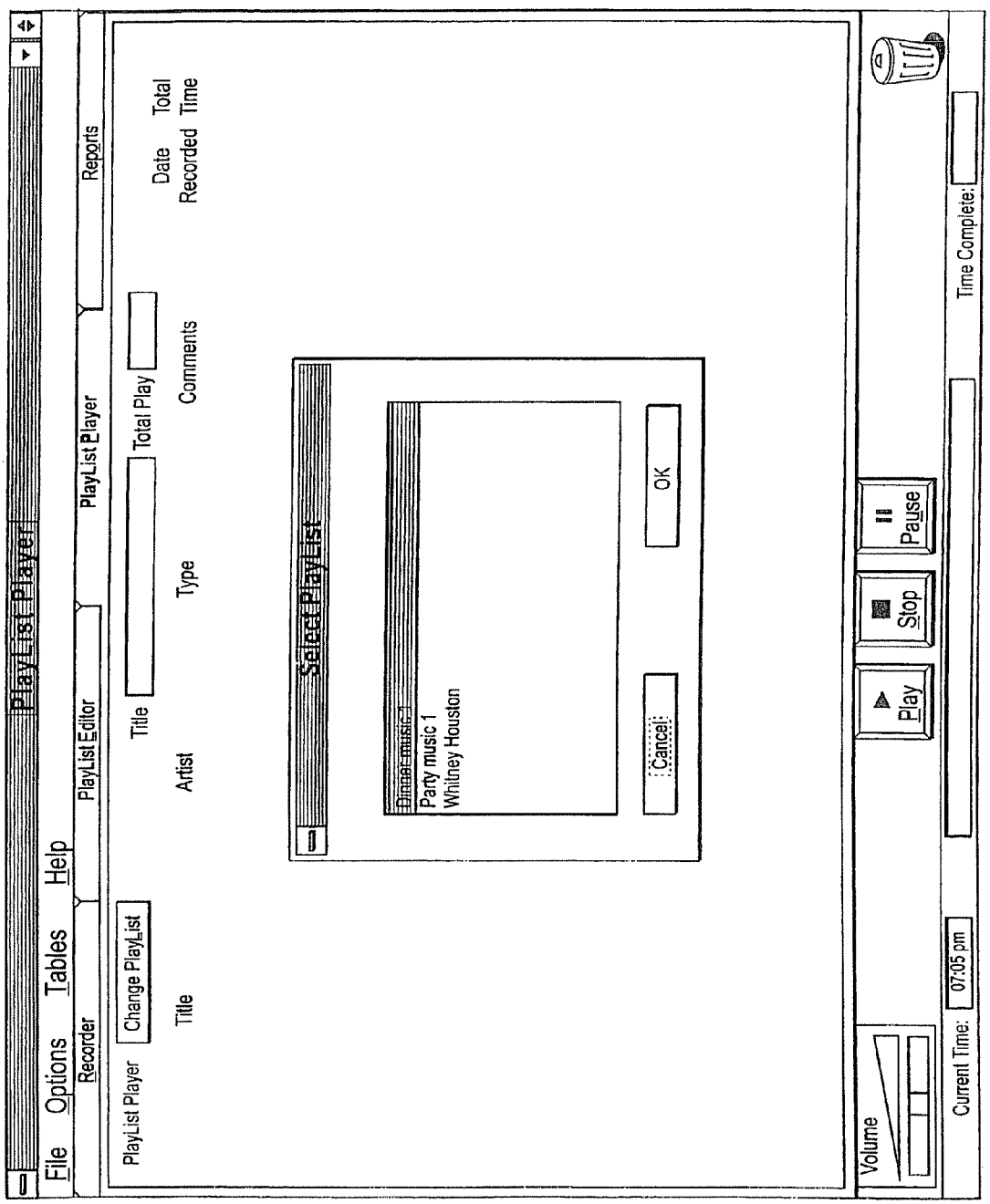

In the event that the user desires to select a particular playlist for execution, in a step 102, FIG. 3A, the playlist master database is read in a step 200, FIG. 3H. The playlist player selection menu FIG. 4J is displayed in a step 202. If the user selects a playlist in a step 204, the playlist detail is read from the appropriate database in a step 206. The selected playlist is then displayed, FIG. 4K, in a step 208.

With respect to FIG. 3I, the user can exit the player screen sequence or can request execution of the playlist in a step 210 at the beginning of the list or at a specified work or song. The list is then executed in a step 212.

Figure 3J:
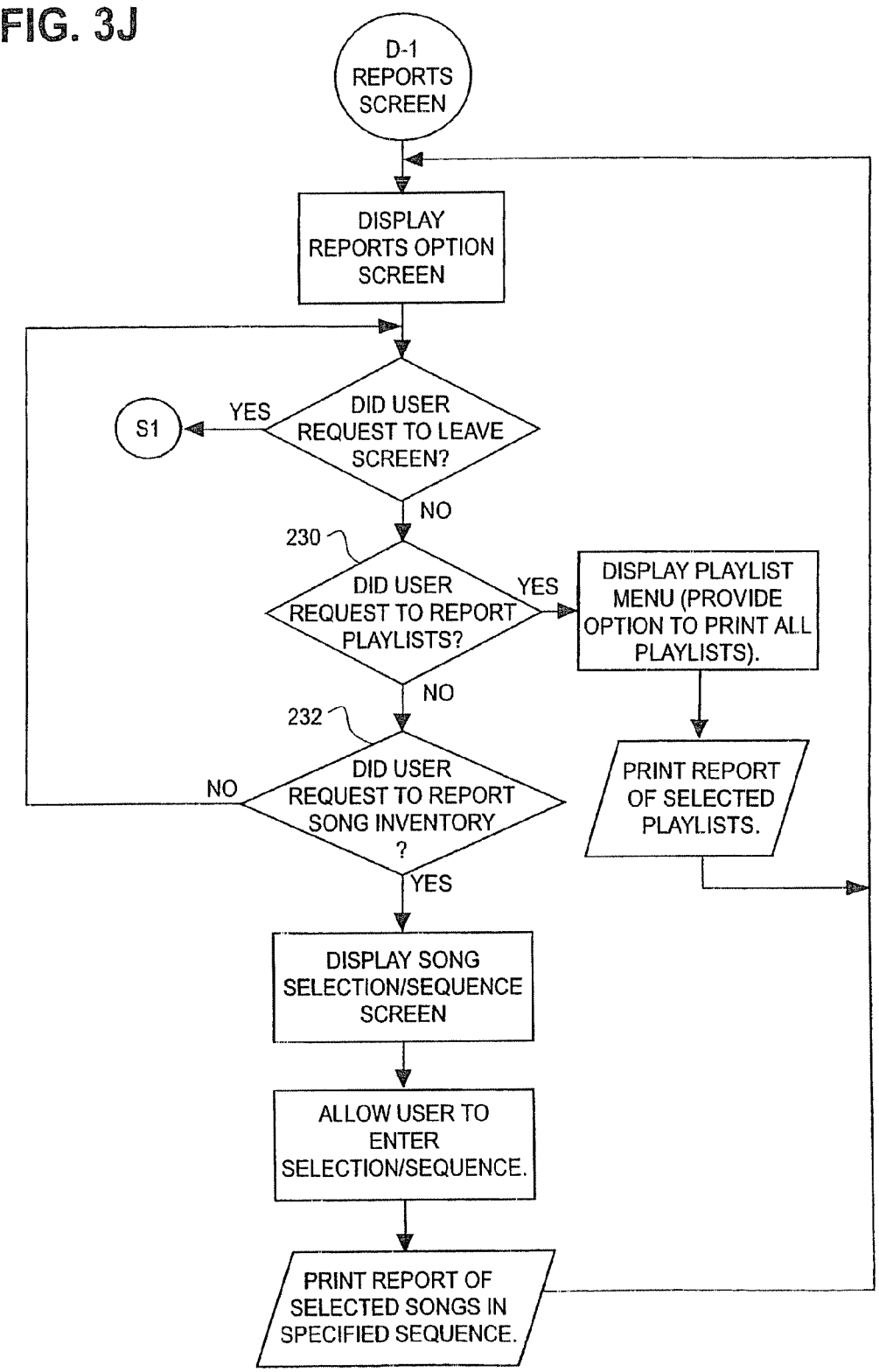

In the event that one or more reports are to be created using the printer 12g, the process of FIG. 3J can be used to request reports as to existing playlists in a step 230. Alternately, the user can request a report of the existing inventory of media elements in a step 232.

Figure 3K:
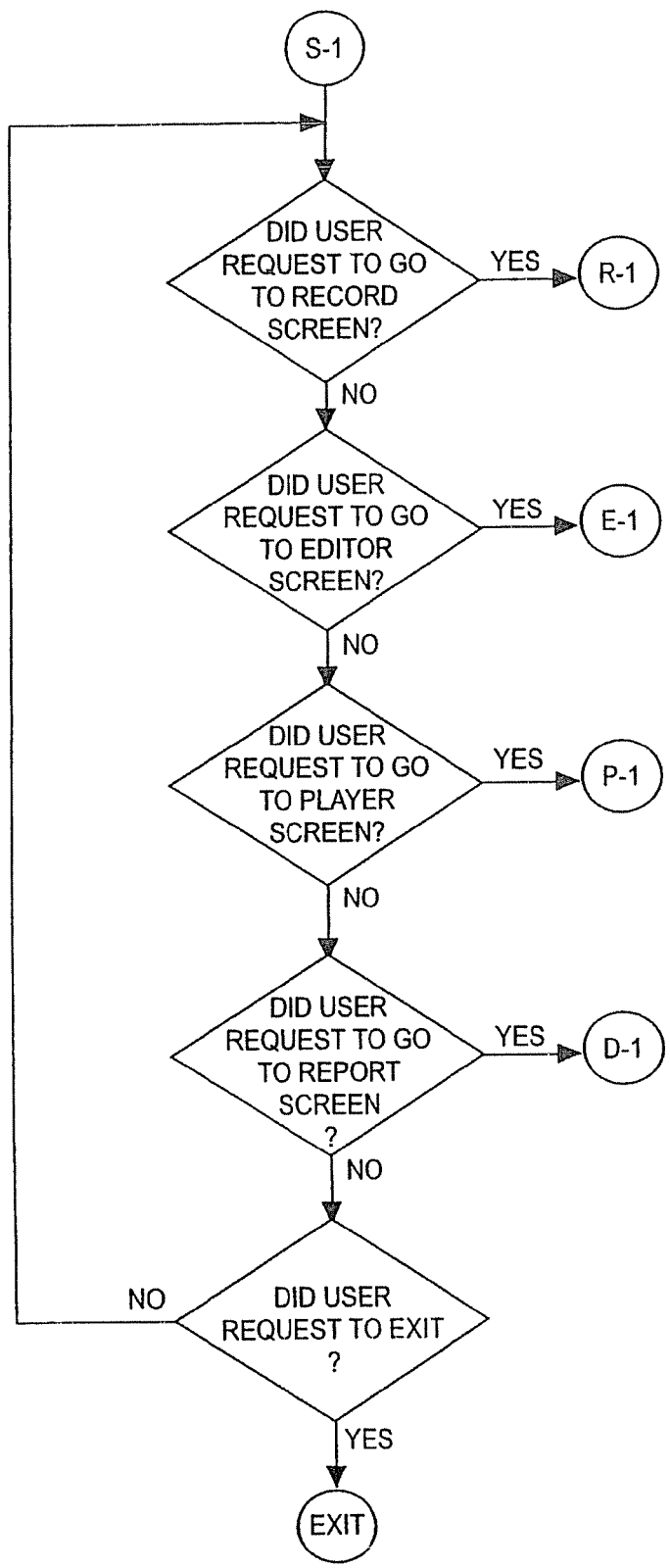
Figure 3L:
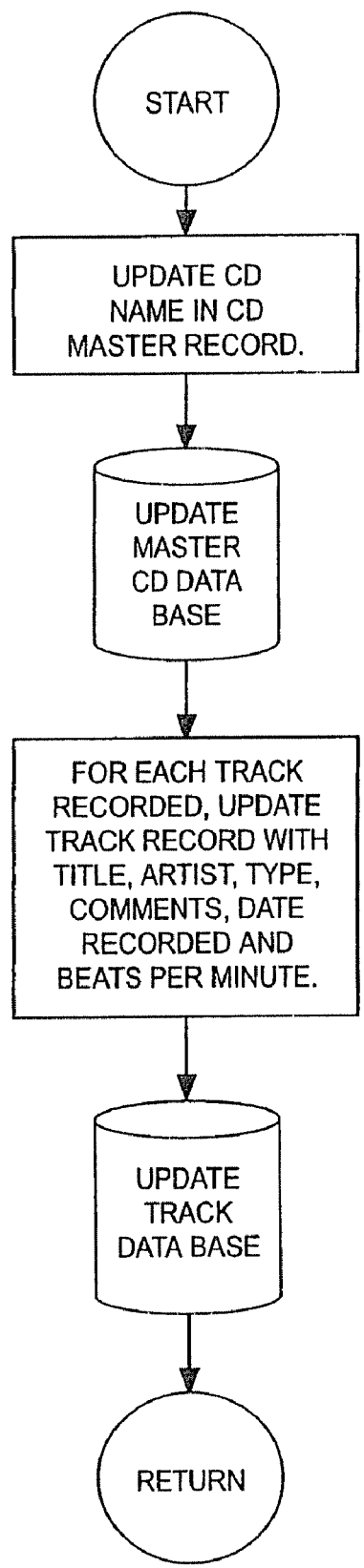

Screen selection is carried out in accordance with the process illustrated in FIG. 3K. Updating of data from the record screen is carried out in a process illustrated in FIG. 3L.

Figure 3M:
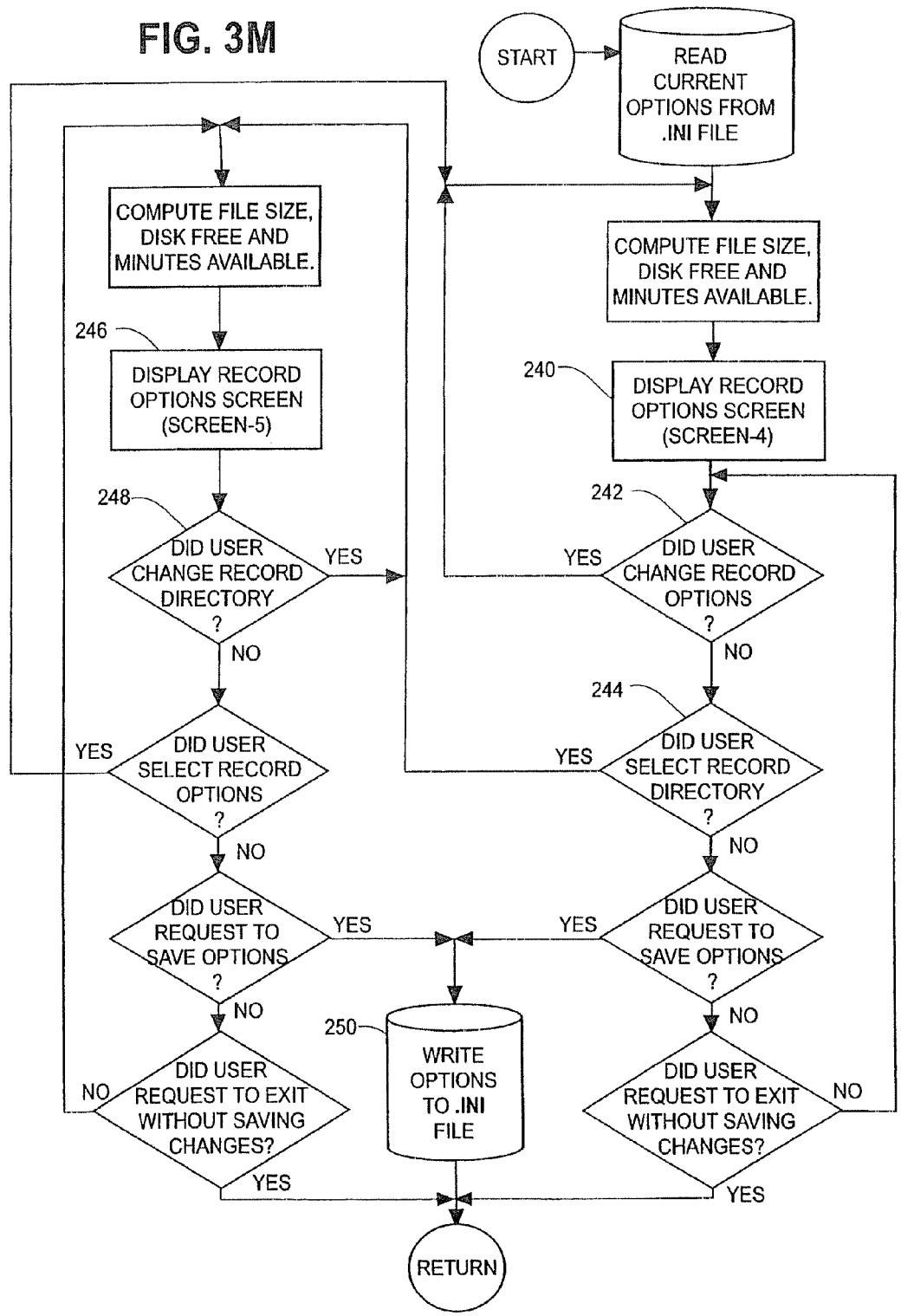

FIG. 3M illustrates steps associated with carrying out requests for various optional functions. For example, in a step 240 an option screen, FIG. 4D, can be displayed for a user.

The user can subsequently in a step 242 change the record options. In the event that the user in a step 244 selects a record directory, the record directory screen FIG. 4E can be displayed in a step 246. The displayed screen can be altered by the user in a step 248. The revised record options can be stored in a step 250 for subsequent use.

Figure 3N:
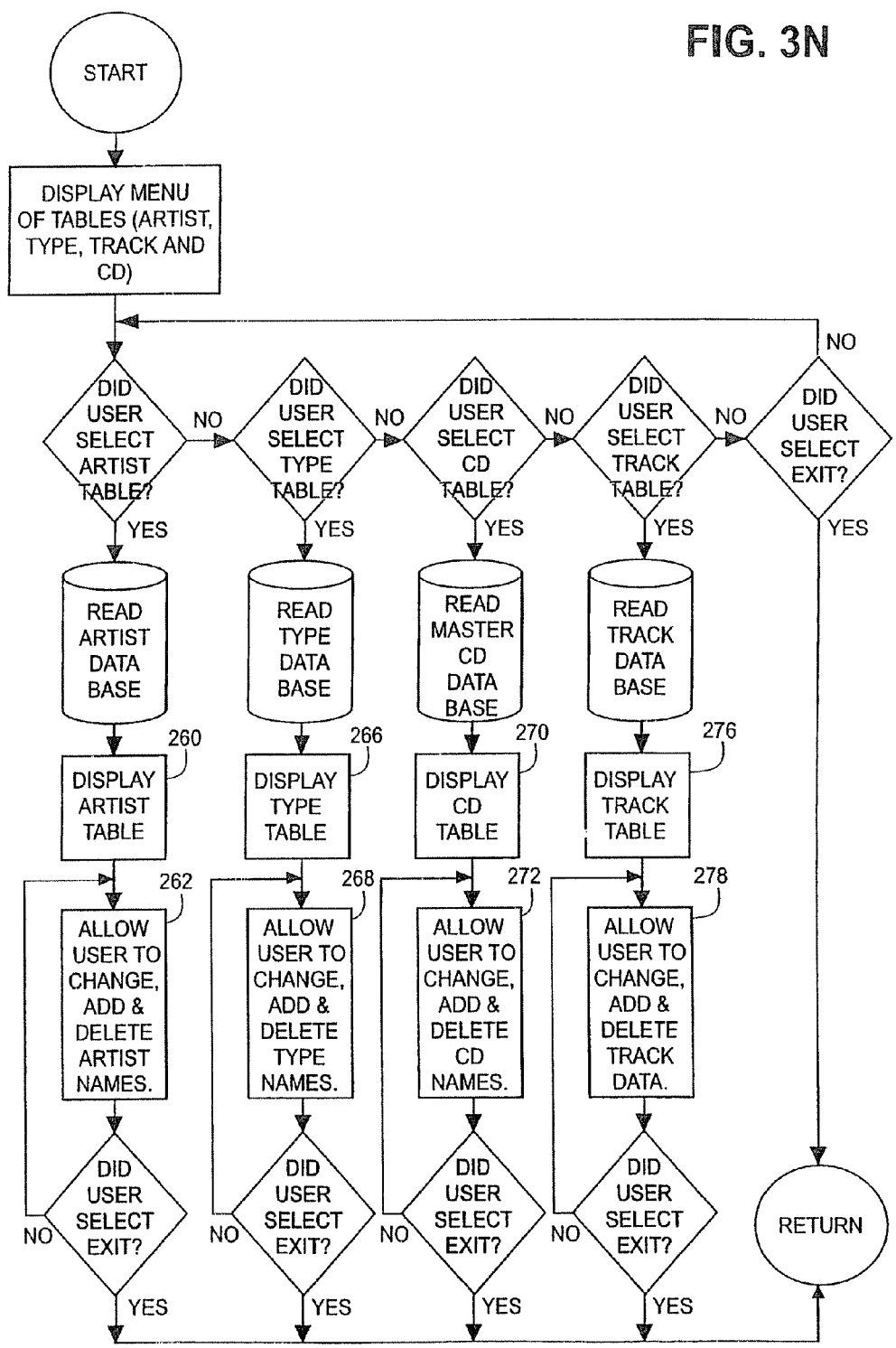
Figure 30:
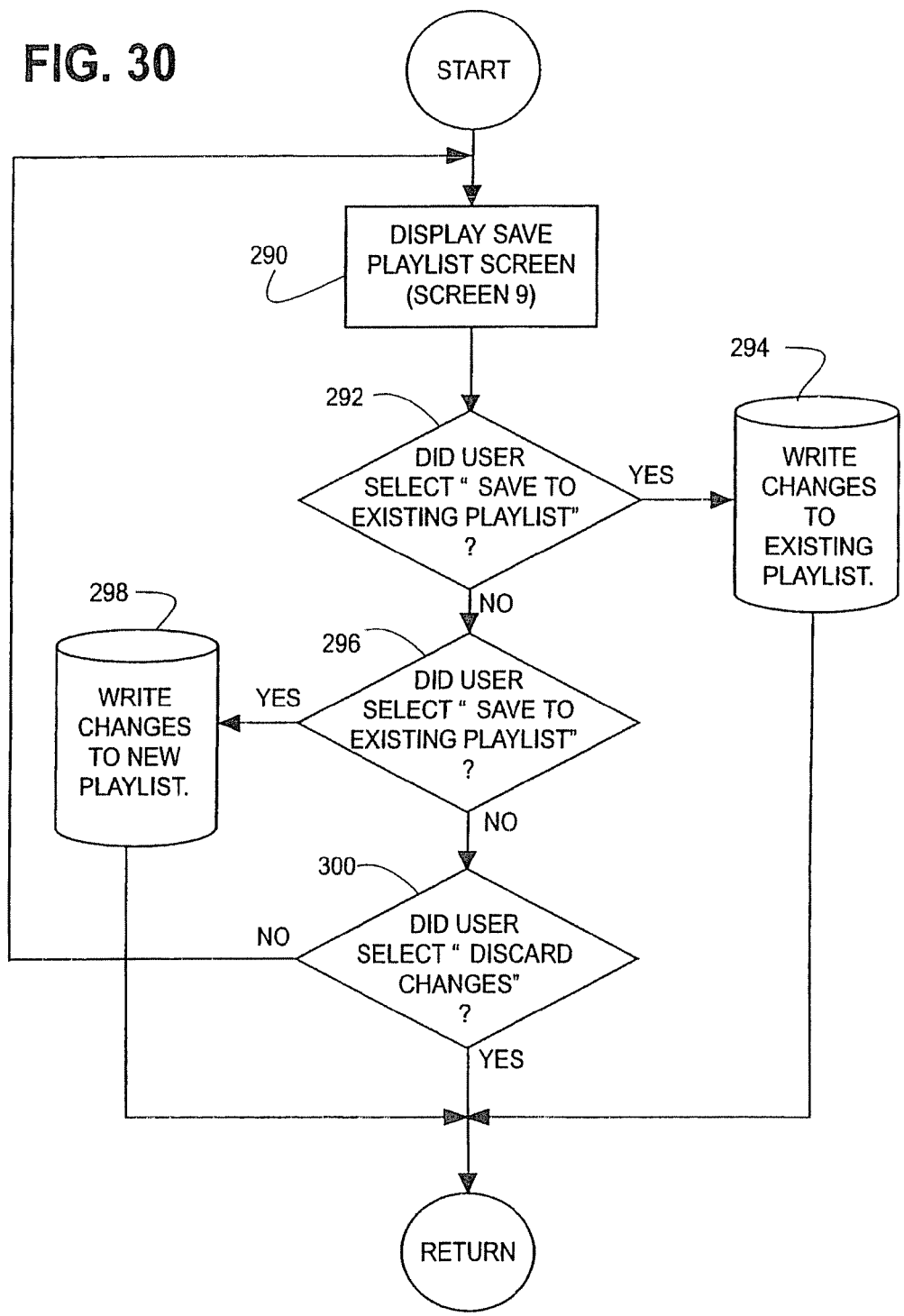

FIG. 3N illustrates steps of a process wherein the user is able to select and display various tables. In a step 260 an artist table can be displayed and edited in a step 262. In a step 266 the type table can be displayed and edited in a step 268. In a step 270, the CD table can be displayed and edited in a step 272. The track table can be displayed in a step 276 and edited in a step 278.

FIG. 3O illustrates the steps in a process of saving the playlist screen, FIG. 4I. In a step 290 the playlist save screen is displayed. In a step 292, if the user has selected to save the existing playlist, the changes are written to the respective database in a step 294. If the user elected to save the new playlist in a step 296, the changes are written to the new playlist database in a step 298. Finally, the user can discard the changes and exit in a step 300.

Figure 3P:

FIG. 3P illustrates the steps of a procedure for deleting a selected work or track.

Hence, as described above, the system 10' can be used to create new or modified playlists, and execute same thereby presenting the sequence of works to a user. Alternately, pre-existing playlists can be edited and additional new playlists created which then subsequently be executed.

Those of skill in the art will understand that other functions as illustrated in FIGS. 3A-3P will also be provided by the control program 16. Attached hereto is a preferred data structure for use with the flow diagrams of FIGS. 3A-3P.

Figure 5:
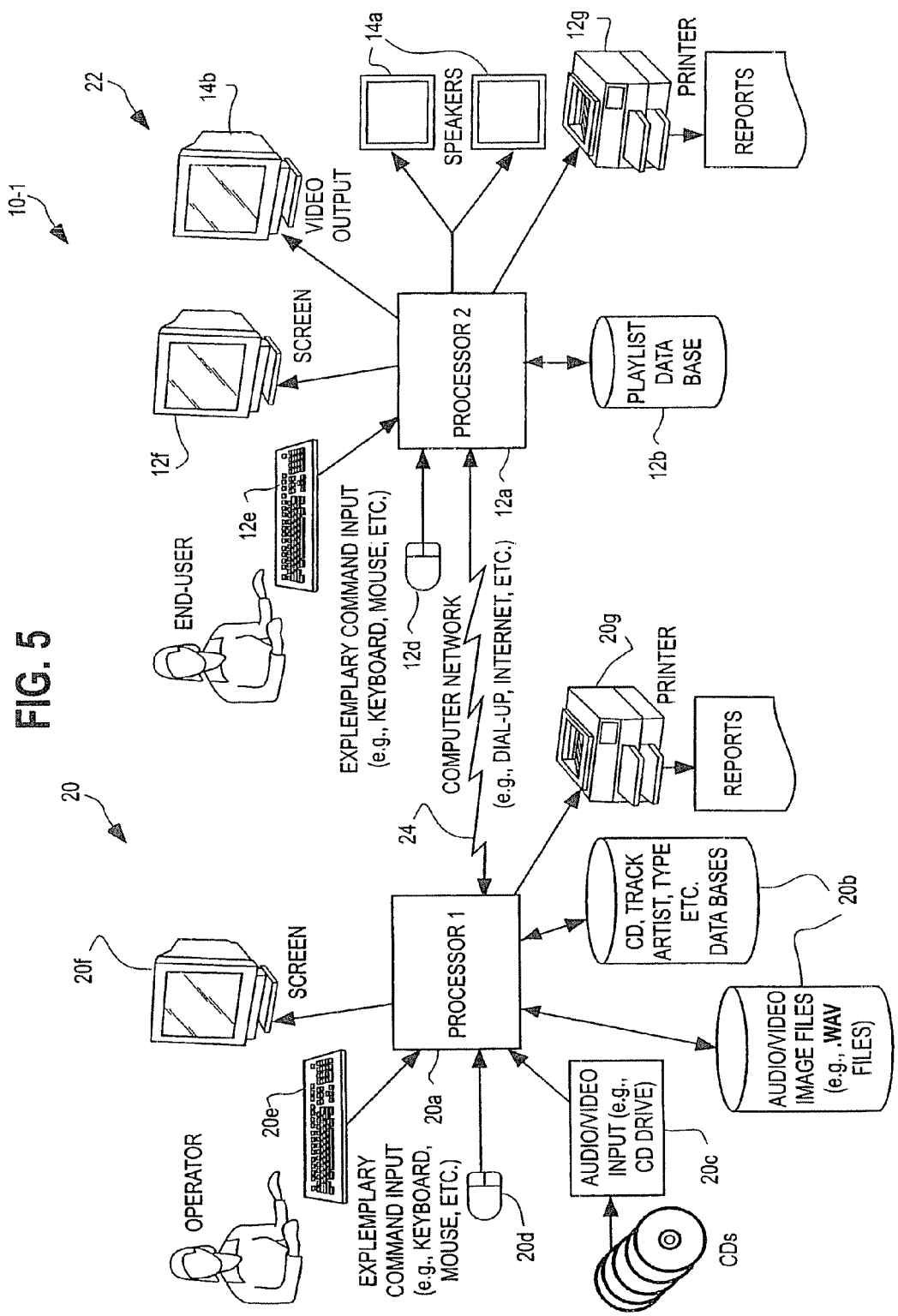
FIG. 5 is a block diagram of a system intended to receive audio or visual works from a remote source.
Figure 6:
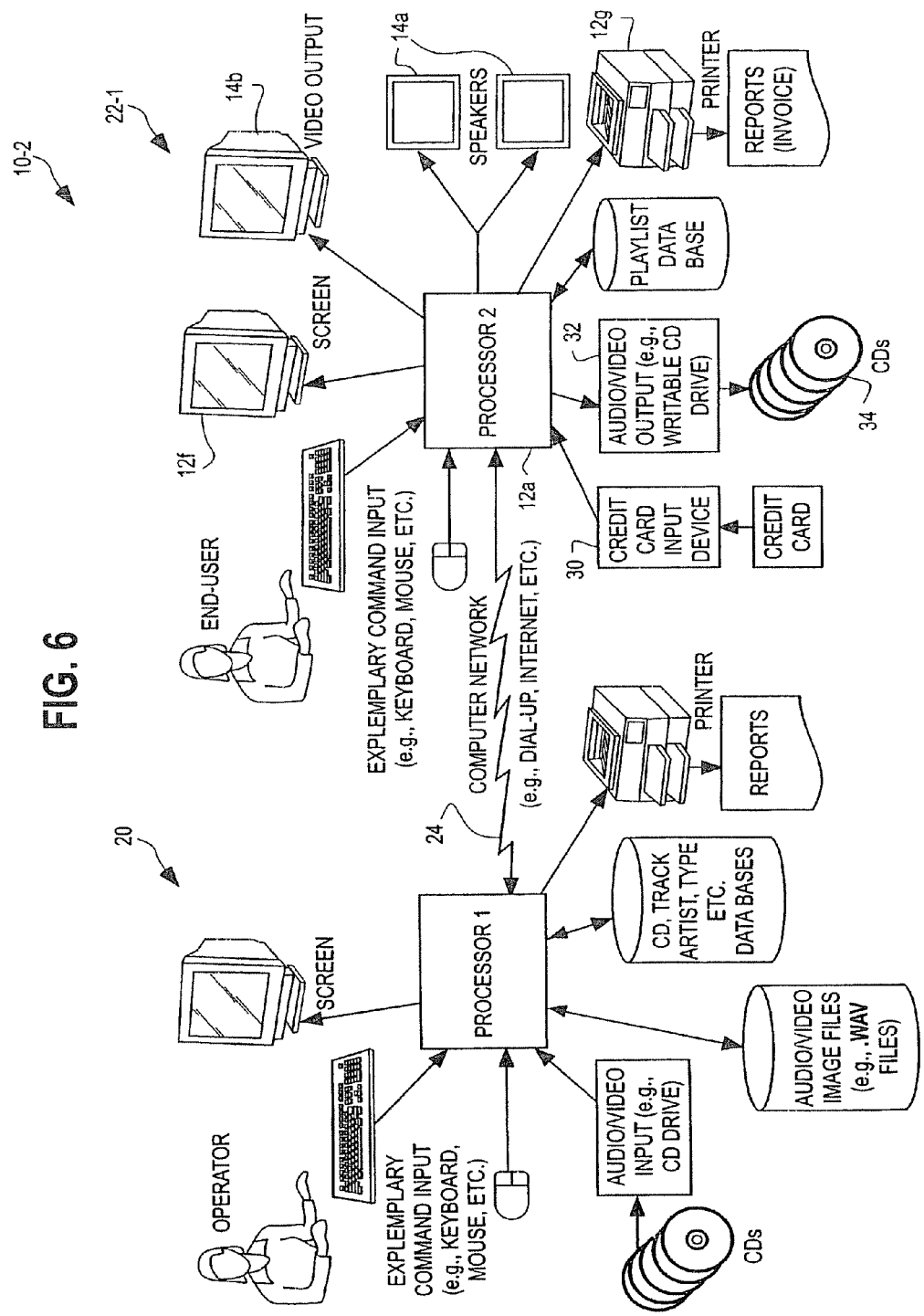
FIG. 6 is a diagram of a system intended to provide a custom written medium of works obtained from a remote source and in response to establishing a predetermined credit.
Figure 7:
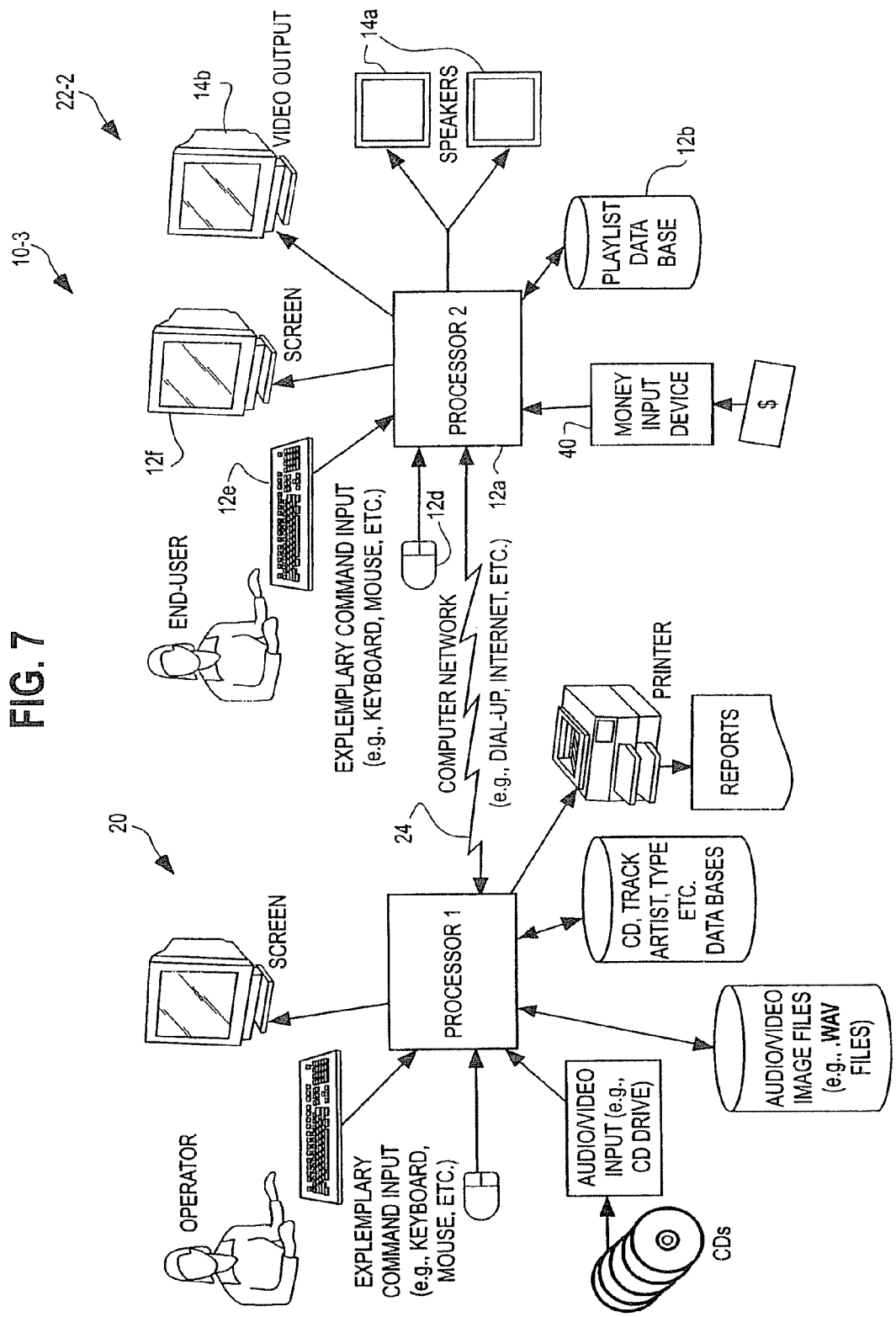
FIG. 7 is a diagram illustrating a system for presenting works on demand from either a local or a remote source.

FIGS. 5 through 7 illustrate alternate types of list building systems. FIG. 5 illustrates a system 10-1 which is a network based playlist creating and executing system. The system 10-1 incorporates a remote source 20 of works which are to be assembled and played or presented at a user's unit or terminal 22. The unit 20 is intended to be an element or a location accessible via a network. For example, the unit 20 can be a location on an intranet or the internet or any other network. It can be accessed via a land line or wireless communication link 24 without limitation.

The system 20 incorporates a processor 20a, and databases 20b. The databases 20b include stored digital representations of a variety of works which can be obtained off of local drives, such as the drive 20c without limitation. The remote system operator has available standard input control devices such as mouse 20d, keyboard 20e or other desired input devices. A display screen 20f of the conventional variety is also provided. The remote system 20 also includes an optional printer 20g for purposes of creating hard copy reports for invoicing, billing or royalty payment purposes without limitation.

The system 20 provides a remote pre-stored inventory which the unit 22 can access via communication link 24. The unit 20 provides supervisory and billing services in response to requests by the end user's unit 22 for access to one or more of the works stored in the inventory in the databases 20b.

Subsequent to the request being authorized, the selected works can be made available to the terminal 22 via the communication link 24. The unit 22 can in turn be used as described previously to create new playlists, edit existing lists and then execute the lists under the control of the local end user. The terminal 22 is especially convenient for the end user in that the works can all be acquired electronically and there is absolutely no need for acquiring and keeping a plurality of CDs.

If desired, processor 12a in system 10-1 can keep track of the number of plays and total play time and transmit that information to processor 20a, for billing purposes. Reports producible by the processor 20a include total plays and play time along with invoices for end users. Documentation for royalty payments to the appropriate recipients can also be created. Finally, the reports can list those works by demand or popularity by day, week or month.

FIG. 6 illustrates a system 10-2 which includes a remote source, such as the remote source 20 and a local terminal 22-1. Terminal 22-1 includes elements similar to the terminal 22 previously discussed. Corresponding elements are identified with the same identification numeral.

The terminal 22-1 additionally includes a credit establishing input such as a credit card reader 30. The reader 30 can be used by a user to make a credit card account number available to the terminal 22-1 for billing purposes.

Once a credit line has been established, the user will be able to use the terminal 22-1 to create and/or modify one or more playlists into write the selected media elements via an output drive 32 to a removable medium 34 which could be a CD or a DVD.

The terminal 10-2 could be located in a business establishment and users interested in obtaining a custom combination of works can access the services of the terminal 22-1 via the reader 30 for purposes of creating and writing the desired sequence of works on the medium 34. Other services made available by the terminal 22 can also be made available by the terminal 22-1 in response to the established credit line.

Additional services that can be made available by the terminal 22-1 include printing invoices via the printer 12g. Report information can be transmitted to the system 20 for billing purposes with respect to the commercial establishment where the terminal 22-1 is located as well as making royalty payments to appropriate recipients.

FIG. 7 illustrates an alternate system 10-3 which can be used for entertainment purposes in public establishments. The system 10-3 provides jukebox-like services at the terminal 22-2. These are under the supervision and control of remote system 20.

The terminal 22-2 includes a credit establishing device which could be a coin or a bill receiving unit 40 of a type used with vending machines. Alternately, the unit 40 could also accept credit cards if desired.

Upon establishing an appropriate credit via the unit 40, the terminal 22-2 enables a user to select one or more works whose titles might be displayed on the control screen 12f via the input devices 12d, 12e.

The selected works could be resident at the local database 12b or could be acquired from the remote unit 20 via the communication link as discussed previously. The system 22-2, unlike conventional jukeboxes, has an unlimited selection of audio or audio/video works available to it via communication link 24. In addition, for security purposes, the terminal 22-2 does not include an inventory of valuable CD or DVD media. The works could include audio works, such as music, audio/visual works such as advertisements, music videos or others.

The terminal 22-2 presents a rolling playlist on the screen 12f which can be reviewed by the end user or individual selecting the works to be presented. Newly selected or identified works are added at the end of the playlist and are presented via speakers 12a and video output 12b in sequence depending on the nature of the work. Hence, the terminal 22-2 makes possible the presentation of arbitrarily selected works, in an arbitrary order in response to the credit established by the unit 40.

The remote system 20 via the link 24 monitors the works being presented and the frequency thereof. Billing information can be generated for purposes of charging the entity where the terminal 22-2 is located for each work which is presented. Reports can be produced at the system 20 identifying royalties to be paid to the appropriate recipients based on the works selected for presentation at the terminal 22-2 or for any other desired purpose. It will be understood that the appropriate file type would be used with the appropriate type of work.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

| Table | Field Name | Data Type | |
|---|---|---|---|
| | | DATA STRUCTURE | |
| Master | CD Number | Long Integer | Created by the track times |
| | CD Title | Text 50 | |
| Track | CD Number | Long Integer | Link to Master CD table |
| | Track | Byte | Track number found on the CD |
| | Artist Code | Integer | Link to the Artist table |
| | Type Code | Long Integer | Link to the Type table |
| | Track Title | Text 50 | |
| | Track Time | Long Integer | Actual time recorded in seconds |
| | File Name | Text 255 | Path/File Name of stored WAV file |
| | Beats | Integer | Beats per minute |
| Playlist Master | Number | Counter | Database assigned key |
| | Title | Text 50 | |
| Playlist Detail | | Integer | Link to Playlist table |
| Number | Play Order | Integer | Order the track was placed within the playbook |
| | CD Number | Long Integer | Link to Track table |
| | Track | Byte | Link to Track table |
| Artist | Artist Code | Counter | Database assigned Artist index |
| | Artist Name | Text 255 | |
| Type | Type Code | Counter | Program assigned index to Music Type |
| | Music Type | Text 50 | |

The invention claimed is:

1. A system for building a playlist comprising a list of digital audio and/or video works stored in an inventory of digital audio and/or video works, comprising:
   a processor;
   a digital storage medium operatively associated with said processor for storing said inventory of digital audio and/or video works;
   a database comprising a plurality of records, each of said records associated with one of said digital audio and/or video works, each record including a title field, an artist field, a type field and a date recorded field; said record also including a comment field consisting of a plurality of characters;
   a user interface, including a display, operatively associated with said processor, for enabling a user to write and store comments associated with respective selected digital audio and/or video works on said digital storage medium;
   said user interface further enabling a user to select digital audio and/or video works from said inventory of digital audio and/or video works;
   said processor, in response to said user selection, building a displayable playlist comprising said user-selected digital audio and/or video works;

a display operatively associated with said processor for displaying at least a portion of said playlist, including displaying said stored comments associated with respective user-selected digital audio and/or video works;

said playlist being executable by a user, whereby said processor plays one or more digital audio and/or video works identified therein; and said playlist further being nameable and storable on a digital storage medium for subsequent execution and/or editing.

2. A method for building a playlist comprising a list of digital audio and/or video works stored in an inventory of digital audio and/or video works, comprising:

digitally storing said inventory of digital audio and/or video works on a digital storage medium, said digital storage medium comprising a plurality of records, each of said records associated with one of said digital audio and/or video works, each record including a title field, an artist field, a type field and a date recorded field; said record also including a comment field consisting of a plurality of characters;

displaying at least a portion of said list of digital audio and/or video works;

selecting at least one of said digital audio and/or video works identified in said list;

writing and storing user comments associated with said selected audio and/or video works to said digital storage medium;

building a displayable playlist comprising at least some of said selected digital audio and/or video works;

displaying at least a portion of said playlist, including displaying said user comments associated with respective user-selected digital audio and/or video works;

executing said playlist, whereby said processor plays one or more digital audio and/or video works identified therein; and naming and storing said playlist for subsequent execution and/or editing.

3. An apparatus for building a playlist comprising a list of digital audio and/or video works stored in an inventory of digital audio and/or video works, comprising:

a processor;

a digital storage medium operatively associated with said processor for storing said inventory of digital audio and/or video works;

a database comprising a plurality of records, each of said records associated with one of said digital audio and/or video works, each record including a title field, an artist field, a type field and a date recorded field; said record also including a comment field consisting of a plurality of characters;

a user interface, including a display, operatively associated with said processor, for enabling a user to write and store comments associated with respective selected digital audio and/or video works on said digital storage medium;

said user interface further enabling a user to select digital audio and/or video works from said inventory of digital audio and/or video works;

said processor, in response to said user selection, building a displayable playlist comprising said user-selected digital audio and/or video works;

a display operatively associated with said processor for displaying at least a portion of said playlist, including displaying said stored comments associated with respective user-selected digital audio and/or video works;

said playlist being executable by a user, whereby said processor plays one or more digital audio and/or video works identified therein; and said playlist further being nameable and storable in a digital storage medium for subsequent execution and/or editing.

* * * * *